United States Patent
Cicchitto et al.

(10) Patent No.: US 10,432,615 B2
(45) Date of Patent: Oct. 1, 2019

(54) AGGREGATOR TECHNOLOGY WITHOUT USERNAMES AND PASSWORDS IMPLEMENTED IN UNIFIED RISK SCORING

(71) Applicant: Avatier Corporation, Pleasonton, CA (US)

(72) Inventors: Nelson A. Cicchitto, San Ramon, CA (US); Anthony R. T. Simmons, Concord, CA (US)

(73) Assignee: Avatier Corporation, Pleasanton, CA (US)

( * ) Notice: Subject to any disclaimer, the term of this patent is extended or adjusted under 35 U.S.C. 154(b) by 0 days.

(21) Appl. No.: 15/826,444

(22) Filed: Nov. 29, 2017

(65) Prior Publication Data
US 2018/0083950 A1  Mar. 22, 2018

Related U.S. Application Data

(60) Continuation-in-part of application No. 15/626,997, filed on Jun. 19, 2017, now Pat. No. 9,979,715, which
(Continued)

(51) Int. Cl.
*G06F 7/04* (2006.01)
*H04L 29/06* (2006.01)
(Continued)

(52) U.S. Cl.
CPC ............ *H04L 63/083* (2013.01); *G06F 21/32* (2013.01); *G06F 21/41* (2013.01); *G06F 21/552* (2013.01); *H04L 63/0815* (2013.01)

(58) Field of Classification Search
CPC ... H04L 63/083; H04L 63/0815; G06F 21/41; G06F 21/552; G06F 21/32
(Continued)

(56) References Cited

U.S. PATENT DOCUMENTS 5,446,891 A * 8/1995 Kaplan ............ G06F 17/30014
7,103,666 B2 9/2006 Royer et al.
(Continued)

FOREIGN PATENT DOCUMENTS

EP      1089516 A3    8/2002

OTHER PUBLICATIONS

Grassi, Paul A. et al., "Digital Identity Guidelines", NIST Special Publication 800-63A, Jun. 2017, 1-32.
(Continued)

*Primary Examiner* — Aravind K Moorthy
(74) *Attorney, Agent, or Firm* — Michael A. Glenn; Perkins Coiel LLP

(57) ABSTRACT

Techniques are described in which for a user to obtain access to or entitlement to objects or locations, such as for example a web application or entry into an accounting office, the system derives a unified risk score associated with the user. The computer compares the unified risk score against a set of rules to determine whether the unified risk score is greater than a particular threshold. Based on such determination, the computer can cause denial of access or entitlement for example by denying entry to the web application or transmitting a denied message to a system that controls the physical lock on the door to the accounting office. In generating the unified risk score, the computer retrieves the most up-to-date identity information about the user by signing on to an aggregator system using any supported login identity provider username and password or other authenticating credentials associated with the user.

20 Claims, 30 Drawing Sheets

Related U.S. Application Data is a division of application No. 15/052,747, filed on Feb. 24, 2016, now Pat. No. 9,686,273.

(60) Provisional application No. 62/120,153, filed on Feb. 24, 2015, provisional application No. 62/427,678, filed on Nov. 29, 2016.

(51) Int. Cl.
| | | |
|---|---|---|
| *H04L 9/32* | (2006.01) | |
| *G06F 21/00* | (2013.01) | |
| *G06F 21/32* | (2013.01) | |
| *G06F 21/41* | (2013.01) | |
| *G06F 21/55* | (2013.01) | |

(58) Field of Classification Search
USPC .................. 726/6, 26; 713/165, 168, 182
See application file for complete search history.

(56) References Cited

U.S. PATENT DOCUMENTS

| | | | |
|---|---|---|---|
| 7,346,923 B2 | 3/2008 | Atkins et al. | |
| 7,536,389 B1 | 5/2009 | Prabhakar et al. | |
| 8,073,810 B2 | 12/2011 | Maes et al. | |
| 8,533,773 B2 | 9/2013 | Maes et al. | |
| 8,589,338 B2 | 11/2013 | Maes et al. | |
| 9,037,864 B1* | 5/2015 | Staddon .................. G06F 21/32 713/182 | |
| 9,449,258 B1* | 9/2016 | Palacio .................. G06K 9/325 | |
| 9,686,273 B2 | 6/2017 | Cicchitto et al. | |
| 9,838,260 B1* | 12/2017 | McClintock .......... H04L 45/122 | |
| 9,979,715 B2 | 5/2018 | Cicchitto et al. | |
| 2003/0163738 A1 | 8/2003 | Couillard et al. | |
| 2005/0238159 A1 | 10/2005 | Halsell et al. | |
| 2008/0289006 A1 | 11/2008 | Hock et al. | |
| 2009/0006195 A1* | 1/2009 | Rosen .................... G06O 30/02 705/14.1 | |
| 2009/0017847 A1 | 1/2009 | Mendiola et al. | |
| 2009/0292814 A1 | 11/2009 | Ting et al. | |
| 2013/0263021 A1 | 10/2013 | Dunn et al. | |
| 2013/0290475 A1 | 10/2013 | Flagg et al. | |
| 2013/0314208 A1 | 11/2013 | Risheq et al. | |
| 2014/0201806 A1* | 7/2014 | Kumar, Sr. ......... H04L 63/1416 726/1 | |
| 2014/0298490 A1* | 10/2014 | Clark ...................... G06F 21/40 726/34 | |
| 2015/0127678 A1 | 5/2015 | Alvi et al. | |
| 2015/0149529 A1 | 5/2015 | Loader et al. | |
| 2015/0205954 A1* | 7/2015 | Jou ....................... G06F 21/316 726/22 | |
| 2015/0304330 A1 | 10/2015 | Soamboonsrup et al. | |
| 2016/0048662 A1 | 2/2016 | Arnoud et al. | |
| 2016/0112397 A1 | 4/2016 | Mankovskii | |
| 2016/0127367 A1* | 5/2016 | Jevans ................ H04L 63/1433 713/152 | |
| 2016/0173500 A1 | 6/2016 | Sharabi et al. | |
| 2016/0226911 A1* | 8/2016 | Boss ...................... H04L 63/20 | |
| 2016/0306965 A1* | 10/2016 | Iyer ...................... G06F 21/552 | |
| 2017/0118239 A1* | 4/2017 | Most .................... H04L 63/1433 | |
| 2017/0140312 A1* | 5/2017 | Pai ...................... G06Q 10/0635 | |
| 2017/0161503 A1* | 6/2017 | Seigel .................... G06F 21/577 | |
| 2017/0195352 A1* | 7/2017 | Yishay ................ H04L 63/1425 | |
| 2018/0004948 A1* | 1/2018 | Martin ................ H04L 63/1425 | |
| 2018/0183827 A1* | 6/2018 | Zorlular ............. H04L 63/1416 | |
| 2018/0343246 A1* | 11/2018 | Benayed ................. G06F 21/41 | |

OTHER PUBLICATIONS

Grassi, Paul A. et al., "Digital Identity Guidelines", NIST Special Publication 800-63C, Jun. 2017, 1-34.

Grassi, Paul A. et al., "Digital Identity Guidelines", NIST Special Publication 800-63 Revision 3, Jun. 2017, 1-53.

Grassi, Paul A. et al., "Digital Identity Guidelines", NIST Special Publication 800-63B, Jun. 2017, 1-55.

* cited by examiner

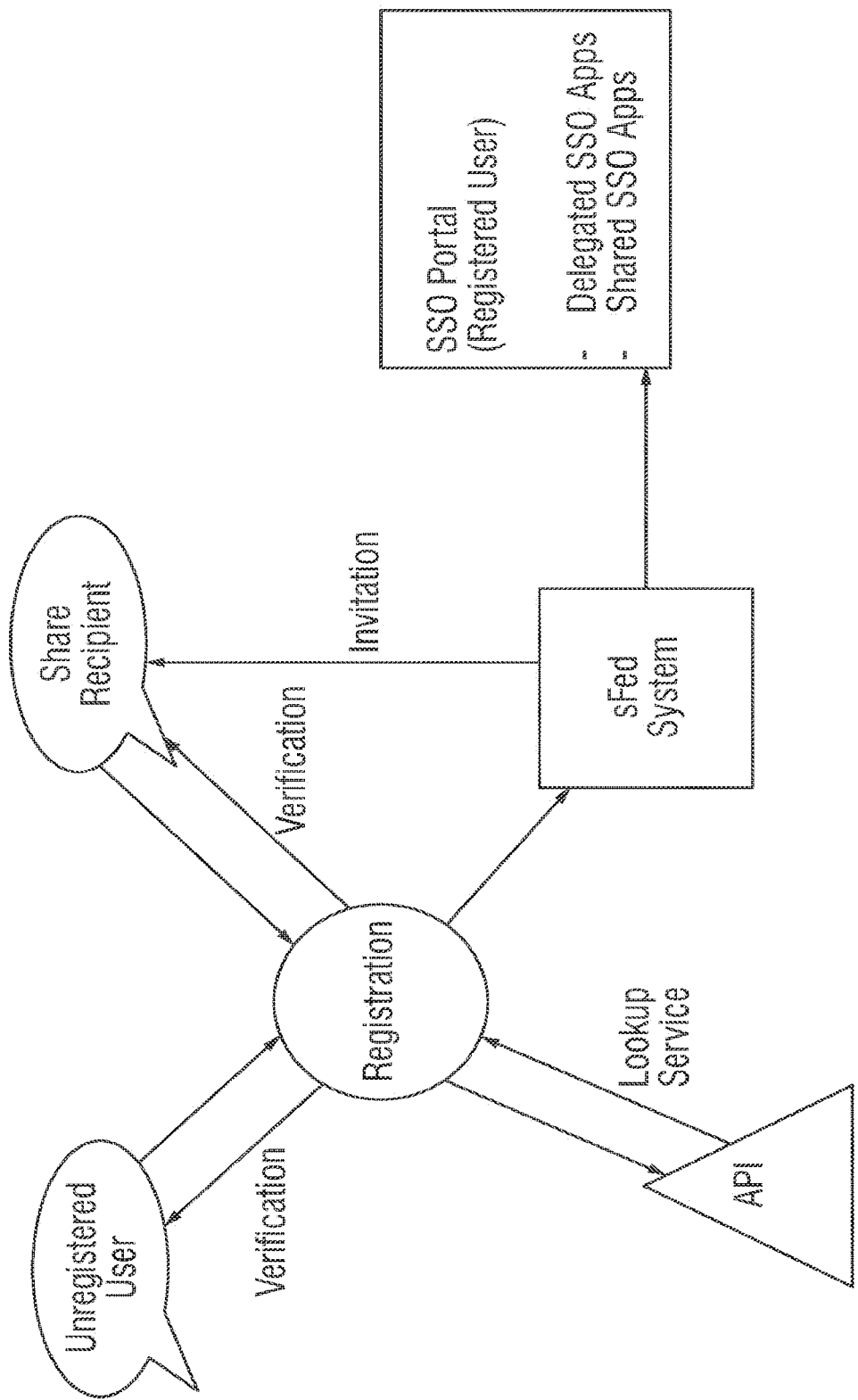

Risk Management Approaches

Strategies
- Avoidance
  - Unplug
- Transfer
  - Insurance
  - Outsource
- Risk Reduction Risk Reduction Controls
- Detective
  - Watch, Identify, & Alert
- Preventive
  - Block & Avoid
- Corrective
  - Remediate

FIG. 17B

Technology Risk Reduction

Non-Integrated Risk

- Identity Governance & Admin
- Business Service Catalog
- Enterprise Password Management
- Mobile (BYOD)
- Cloud (BYOC)
- SIEM/ESM
- Ticketing
- Etc...

AGGREGATOR TECHNOLOGY WITHOUT USERNAMES AND PASSWORDS IMPLEMENTED IN UNIFIED RISK SCORING

CROSS REFERENCE TO RELATED APPLICATIONS

This patent application is a continuation-in-part of copending U.S. patent application Ser. No. 15/626,997, AGGREGATOR TECHNOLOGY WITHOUT USERNAMES AND PASSWORDS, filed Jun. 19, 2017, which is incorporated herein by reference in its entirety, which is a divisional of U.S. patent application Ser. No. 15/052,747 (now U.S. Pat. No. 9,686,273) AGGREGATOR TECHNOLOGY WITHOUT USERNAMES AND PASSWORDS, filed Feb. 24, 2016, which is incorporated herein by reference in its entirety, and additionally claims priority from U.S. Provisional Patent Application No. 62/120,153, SOCIAL SINGLE SIGN-ON AGGREGATOR WITHOUT USERNAMES AND PASSWORDS, filed Feb. 24, 2015, which is also incorporated herein by this reference in its entirety, and additionally claims priority from U.S. Provisional Patent Application No. 62/427,678, CONTEXTUAL RISK SERVICE PRESENTATION, filed Nov. 29, 2016, which is incorporated herein by reference in its entirety.

BACKGROUND OF THE INVENTION

Technical Field

This innovation relates generally to the field of automated identity and access management technology in a unified risk implementation. More specifically, this innovation relates to using aggregator technology without usernames and passwords for automating identity and access management in a unified risk implementation.

Background

Many organizations rely on technological identity and access management solutions to keep pace with the growth of their organizations, e.g. gaming and hospitality enterprises. Thus, for example, such organizations deploy automated user de-provisioning or password policy enforcement.

In today's environment, partner enterprises allow an external user from one organization outside of their network to have access to an internal application of their organization within their own network. This type of partnership can be referred to as federated identity management. With using federated identity management, an internal application written at Company A can be made publicly available. For a user at Company B on one type of network to access on an entirely different network the internal application written at Company A, the user has to perform the following procedure. The user creates an internal ID at Company A, enters the internal application and maps his external ID from his own network to his internal ID on Company A's network. Further, Company A can allow the user to access their internal application by the user using a social network account, such as a LinkedIn (Mountain View, Calif.; "LinkedIn") account for example. Then, Company A can link the external user's social network account sign on to Company A's internal application.

The technique described above allows Company A to manage their partners' access to their internal applications.

Today, there's a technology known as federation, which allows an enterprise to manage their partners' access to their internal applications. However, federation requires high maintenance for every partner company and a lot of initial effort to set up and configure.

Current practices for obtaining risk are limited to on the premises of an organization or other location, e.g. giving an employee a badge to get into the secured building, or based on only financial activity, e.g. a credit risk score. The process for deriving a risk score presently has limited applications.

SUMMARY

Techniques are described in which for a user to obtain access to or entitlement to objects or locations, such as for example a web application or entry into an accounting office, the system derives a unified risk score associated with the user. When the user makes the request, a computer computes the unified risk score. The computer can compare the unified risk score against a set of rules to determine whether the unified risk score is greater than a particular threshold. Based on such determination, the computer can cause denial of access or entitlement for example by denying entry to the web application or transmitting a denied message to a system that controls the physical lock on the door to the accounting office. In generating the unified risk score, the computer can retrieve the most up-to-date identity information about the user by signing on to an aggregator system using any supported login identity provider username and password or other authenticating credentials for the user. The system, has previously, automatically created a system secret or private identity such as a secret username and secret, highly securely generated password, both of which are unknown and inaccessible to the user. The secret identity, such as secret username and password, is stored in an lightweight directory access protocol (LDAP) server or database or in a distributed cloud database system. The aggregator system had previously mapped the login identity provider user name to the secret user name and password for subsequent usage, such as by the computer.

BRIEF DESCRIPTION OF THE DRAWINGS

One or more embodiments of the present invention are illustrated by way of example and not limitation in the figures of the accompanying drawings.

FIG. 5A is a flow diagram of a process for registration to a social federation system, according to an embodiment;

FIG. 9 illustrates an example of a user interface of a delegation page in which a user can enter a delegation type, provider type, provider user name, applicable filters, and a selection of one or more applications to share, according to an embodiment;

FIG. 10 illustrates an example of a user interface showing a sample dropdown list of the provider types of FIG. 9, according to an embodiment;

FIG. 11 illustrates an example of a user interface showing a home page of the aggregator system, according to an embodiment;

FIG. 12 illustrates an example of two different devices, a tablet and a smartphone, each displaying the home page web page of the aggregator system, according to an embodiment;

FIG. 17A-F are schematic diagrams illustrating various criteria and definitions concerning computing the unified risk score, according to an embodiment.

DETAILED DESCRIPTION

Figure 1:
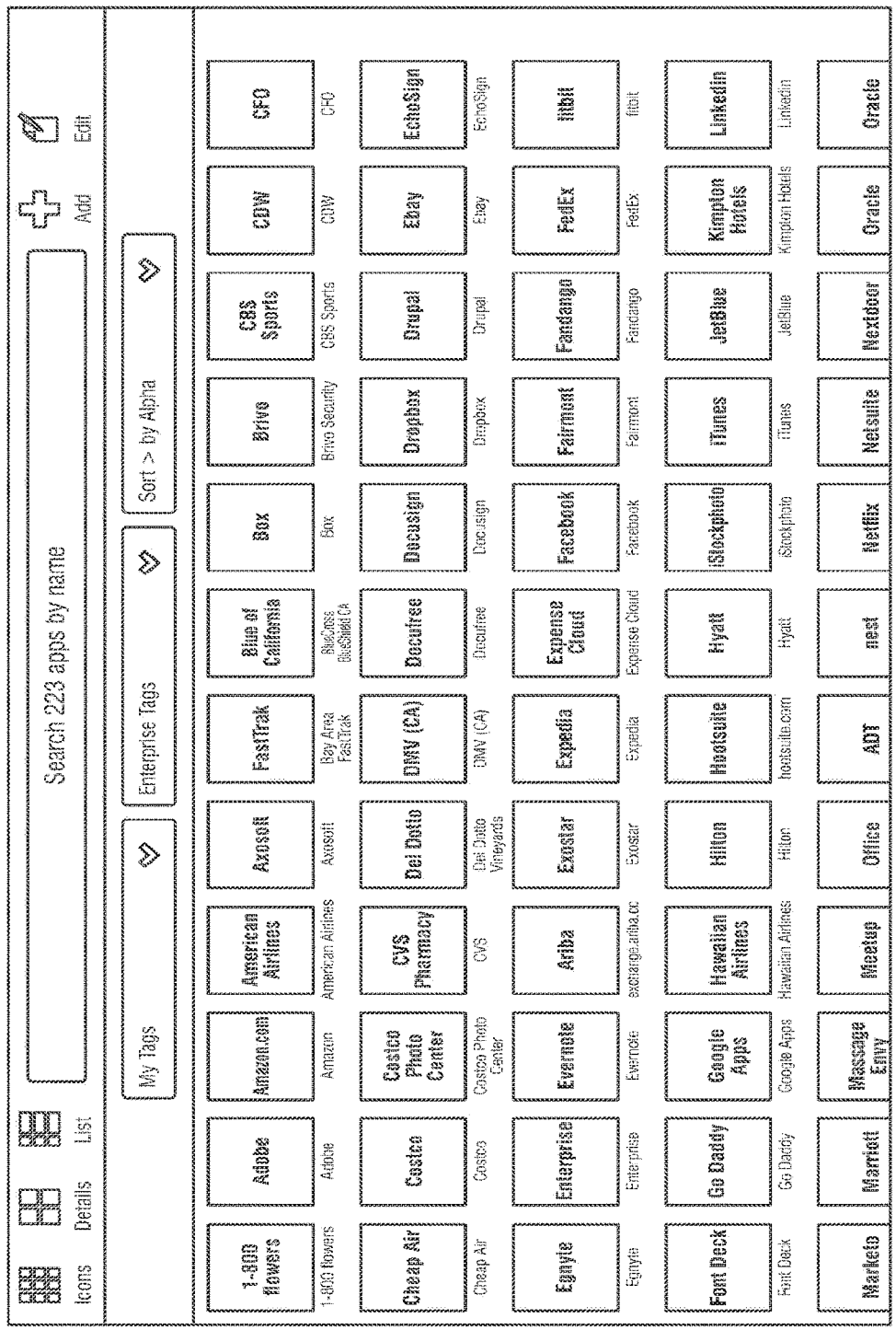
FIG. 1 illustrates an example of an interface of a user's page of an aggregator platform, according to an embodiment.

Techniques are described in which for a user to obtain access to or entitlement to objects or locations, such as for example a web application or entry into an accounting office, the system derives a unified risk score associated with the user. When the user makes the request, a computer computes the unified risk score. The computer can compare the unified risk score against a set of rules to determine whether the unified risk score is greater than a particular threshold. Based on such determination, the computer can cause denial of access or entitlement for example by denying entry to the web application or transmitting a denied message to a system that controls the physical lock on the door to the accounting office. In generating the unified risk score, the computer can retrieve the most up-to-date identity information about the user by signing on to an aggregator system using any supported login identity provider username and password or other authenticating credentials for the user. The system, has previously, automatically created a system secret or private identity such as a secret username and secret, highly securely generated password, both of which are unknown and inaccessible to the user. The secret identity, such as secret username and password, is stored in an lightweight directory access protocol (LDAP) server or database or in a distributed cloud database system. The aggregator system had previously mapped the login identity provider user name to the secret user name and password for subsequent usage, such as by the computer.

Further, an embodiment is configured to provide historical trending, for a company for example. By data mining any of the aggregation of data and by employing features regarding risk measurement, risk weighting, aggregate risk scores, the risk source radar, entitlement risk scoring in store intelligence, configuring risk intelligence, configuring composite risk levels, and so on discussed in further detail below, a risk baseline at the individual or aggregate level is established. Once a baseline is established, it can be determined or measured whether particular risks or other related entities, such as risk scores or a unified risk score, for an individual or group of individuals are above and below a particular baseline.

Also introduced here is a technique with which to access a user's web applications. The user registers and signs on to an aggregator system using any supported login identity provider username and password. When the user registers for the first time, the system collects additional information to verify the user for a subsequent access to the system. The system also automatically creates an system secret username and secret, highly securely generated password, both of which are unknown and inaccessible to the user. The secret username and password are stored in an lightweight directory access protocol (LDAP) server or database or in a distributed cloud database system. The system also maps the login identity provider user name to the secret user name and password for subsequent usage.

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, the embodiments referred to also are not necessarily mutually exclusive.

An Exemplary Embodiment of an Aggregator Platform Without Usernames and Passwords An exemplary embodiment of an aggregator platform without usernames and passwords is a social single sign-on ("sSSO") platform. It should be appreciated that the technique discussed herein can also refer to the aggregator system or application, depending on the context of the discussion. Such platform comprises a server that aggregates a plurality of web applications both internal to an organization and that are public facing to login identity providers including social networking sites such as for example LinkedIn or Facebook (Menlo Park, Calif.; "Facebook"). The platform presents the aggregation of such web applications as links provided to a particular user.

Examples of login identity providers include but are not limited to social networking sites, LinkedIn and Facebook. A sample non-exhaustive list can be found in FIG. 4, which is described in further detail below.

Non-exhaustive examples of web applications that can be aggregated by the server can be found in FIG. 1. FIG. 1 is a sample innovative interface of a user's page on a sSSO application, which displays a collection of web applications which the user had previously added to his sSSO application.

It should be appreciated that the aggregator platform is not limited to the social single sign-on environment. The techniques introduced herein are applicable to aggregators that allow end users to add an application, such that to link to the application at any future time, and from any device, would not need to reenter an ID and/or password. However, employing the social single sign-on implementation of the technique as discussion herein is for purposes of understanding the innovation herein and not for limiting purposes.

To access any of the user's web applications, the user registers and signs on to a social sign-on system ("sSSO") using any supported login identity provider user name and password. For example, the user can register to sSSO using his user name and password that he uses for his LinkedIn account. If the user is registering for the first time, the sSSO collects additional information to verify the user later such as for a subsequent access to sSSO. For example, sSSO can collect but is not limited to collecting the user's mobile phone number, questions and answers related to information unique to the user, pictures, biometric data, and/or social information from the identity providers, such as for example information regarding friends, pictures, dates, and conversations. sSSO also automatically creates an sSSO secret user name and a sSSO secret, highly securely generated password. Both such secret user name and secret password are unknown and inaccessible to the user. In an embodiment, this secret user name and secret password are stored in an lightweight directory access protocol (LDAP) server or database or in a distributed cloud database system, etc. sSSO also maps or links the login identity provider user name to the secret user name and password of sSSO system for subsequent usage.

After the user has registered, the user can start using signal sign-on to login automatically to web applications available to the sSSO system. The login identity provider is mapped to the sSSO secret internal user name for purposes of displaying the configured SSO enabled web applications to the appropriate sSSO logged in user. In short, the sSSO secret internal user name is used to display the right apps (web applications) to the right user. Thus, for example, when the user obtains a new, upgraded smartphone, the user does not need to download and reenter the user ID and password for each of his web applications. The user can access any and all of his applications registered in the sSSO from the sSSO application.

Figure 2:
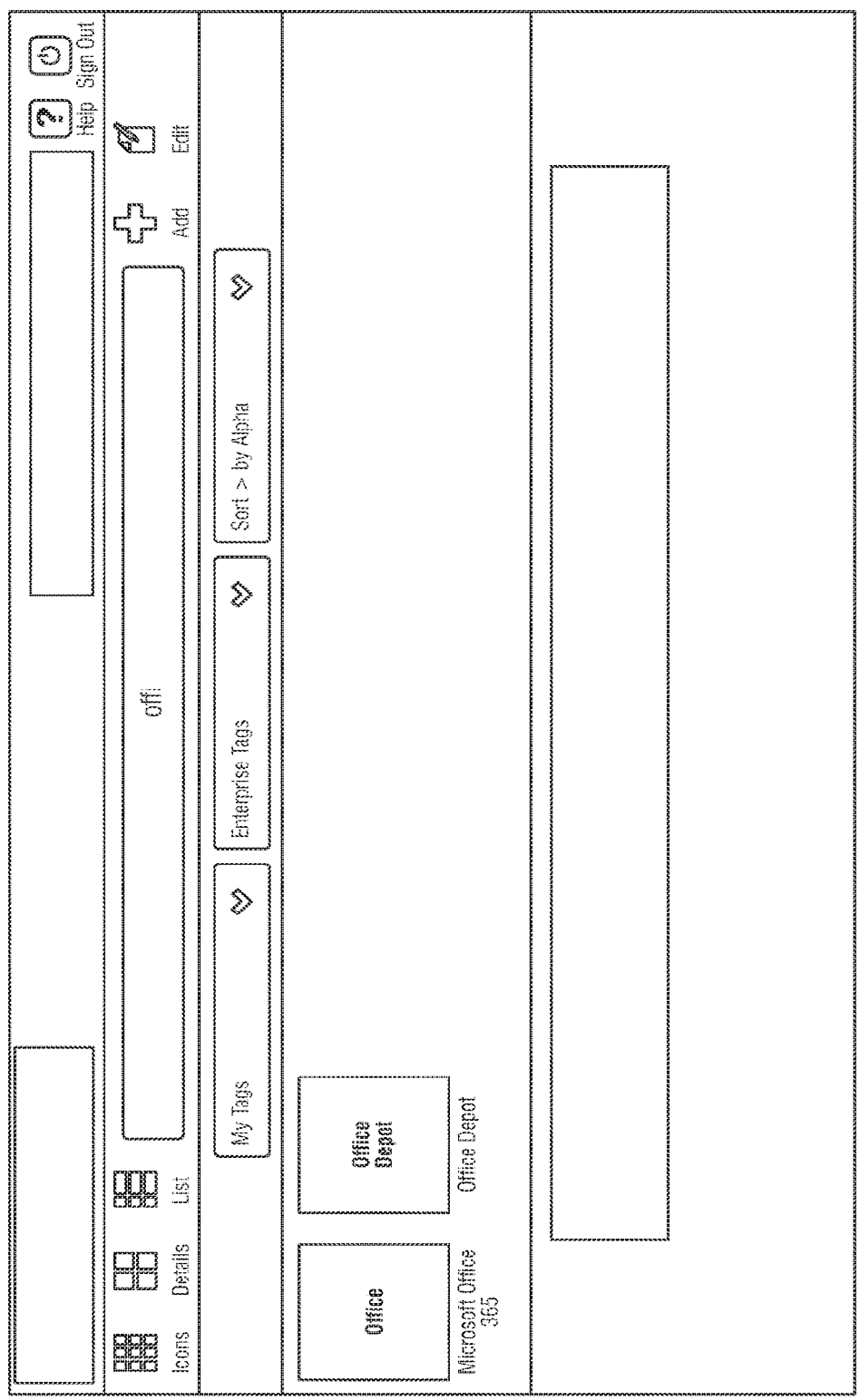
FIG. 2 illustrates an example of a user interface showing two icons representing an enabled application on the aggregator platform and a not-enabled application on the aggregator platform, according to an embodiment.

FIG. 2 is a sample user interface showing icons representing an enabled and a not enabled SSO application. In this example, the leftmost icon, e.g. Office, represents an SSO enabled application while the icon to the right represents a web application, e.g. Office Depot, that is not enabled. In this example, the sSSO application is configured to display a visual indicator, such as the triangle with the exclamation sign inside, to indicate that such web application is not sSSO enabled.

Figure 3:
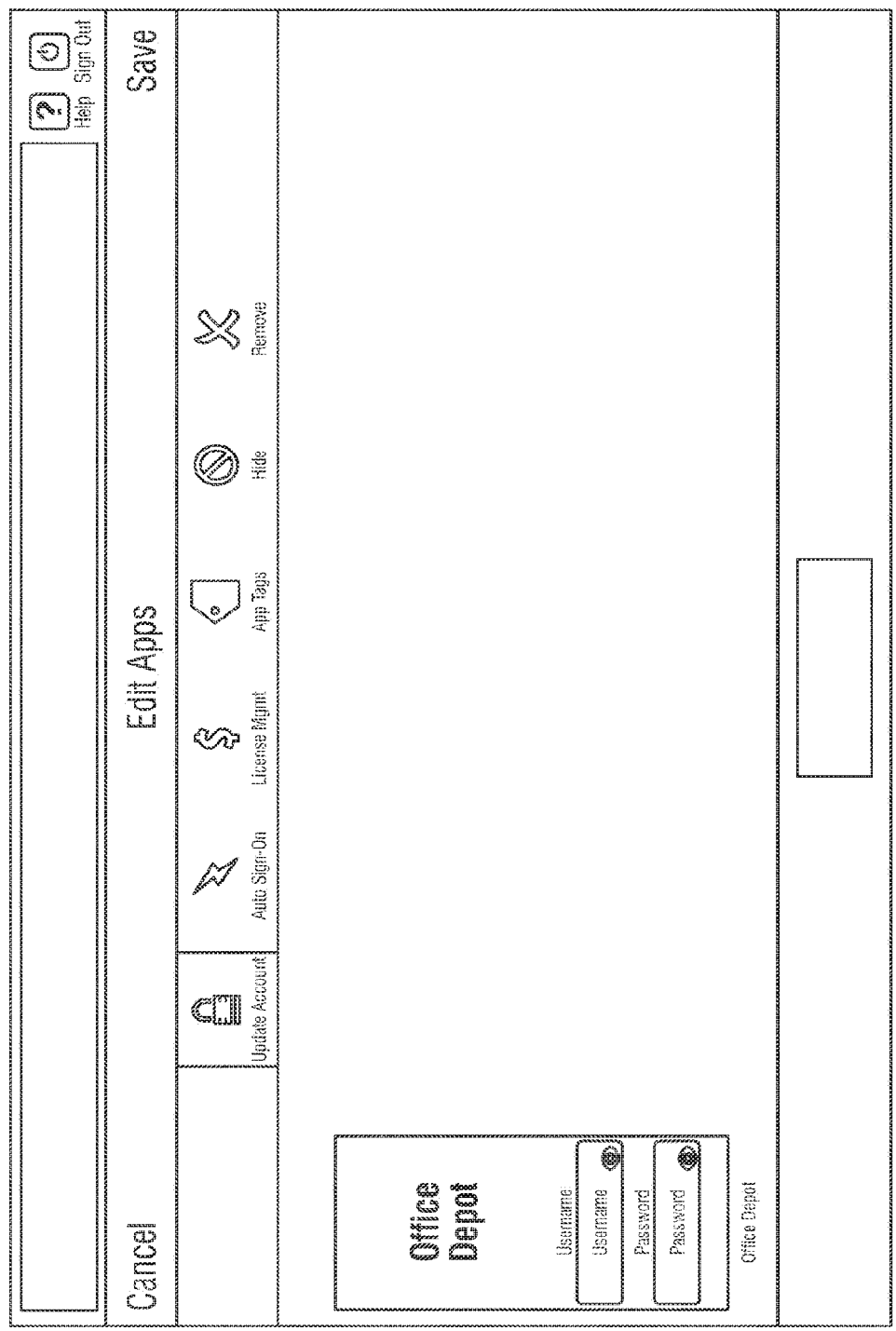
FIG. 3 illustrates an example of a user interface showing a log in graphical user interface (GUI) for a user to add and configure an organization to his aggregator platform, according to an embodiment.

In an embodiment, to enable a web application for sSSO requires entering a user name and optionally a password. An example implementation can be found in FIG. 3. FIG. 3 is a sample user interface of a registration screen to register a particular web application. In the registration screen, a user can enter his or her user name and optionally his or her password for the particular web application.

If the SSO web application, e.g. Office Depot in FIG. 3, is also a login identity provider then sSSO automatically maps or otherwise links the new login identity provider to the sSSO internal secret user name, which enables that login identity provider, e.g. Office Depot, to be used for login in purposes in addition to the existing registered login identity provider, e.g. the original sSSO system. As another example, Facebook and LinkedIn could both be login identity providers to the sSSO system assuming the LinkedIn web application was enabled for single sign-on.

If the sSSO user decides to login using a new unregistered login identity provider, e.g. Facebook, and the user never enabled that login identity provider web application for SSO, the sSSO system will attempt to identify the end user. For example, the sSSO system can go to and use a stored list of usernames and related metadata such as email addresses, actual names, etc., and display candidate selections, e.g. a list of users with similar names from the registered login identity providers, e.g. FACEBOOK: Julie@yahoo.com. That is, the sSSO system prompts the user to pick the login identity provider user name that they recognize. The login identity provider user name can be received by other input means such as for example the user entering his or her user name in a text box, audibly providing the user name, selecting an image that is recognized by the user, providing biometric data such as a finger print, and so on. In addition to using the received user input, the sSSO verifies the identity of the sSSO user by using additional registration information, that is information which was provided by the user when the user registered. For example, such additional registration information can include but is not limited to SMS, Questions/Answers, already registered login identity provider information, biometric information, etc.

Figure 4:
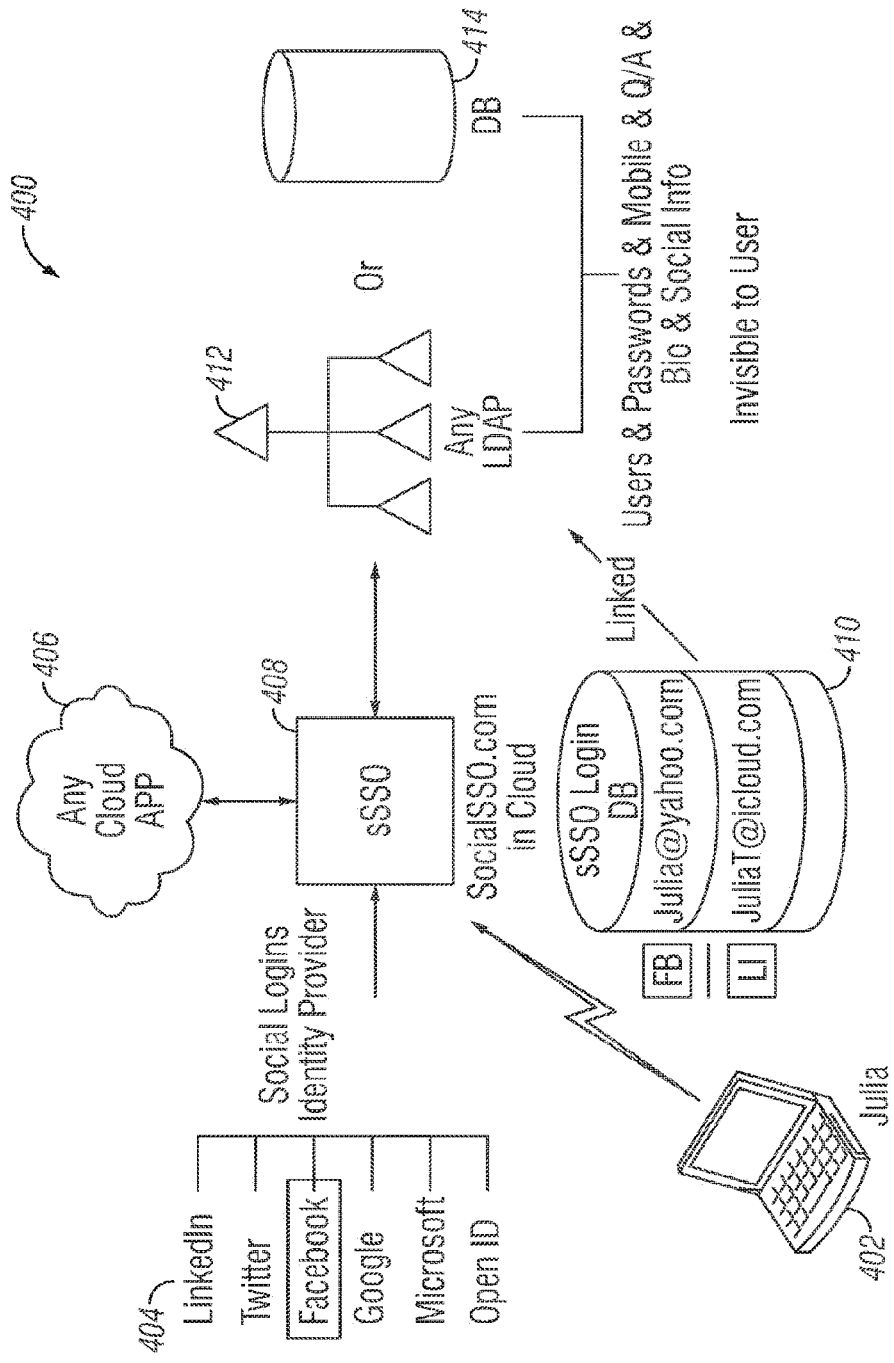
FIG. 4 is a schematic diagram of a system architecture for the aggregator platform, according to an embodiment.

An Exemplary Embodiment of Social Single Sign-On Without Username or Password from a Single Sign-On Provider An embodiment can be understood with reference to FIG. 4. FIG. 4 is a schematic diagram of a system architecture for an aggregator platform, such as for example sSSO, without username or password from the provider, such as for example a SSO provider, 400. A user 402 logs into a social single sign-on (sSSO) application 408, e.g. such as at a website, SocialSSO.com for example, in a network environment such as in a cloud environment. A plurality of social login identity providers 404 are communicably connected with sSSO 408 such that for example a user can log onto sSSO 408 through any of these connected social logins identity providers 404. sSSO 408 is communicably connected to a repository, sSSO login database (DB) 410. In this illustrative example, repository 410 is storing two usernames associated with user 402: Julia@yahoo.com associated with her Facebook account and JuliaT@icloud.com associated with her LinkedIn account. sSSO 408 is communicably connected to web applications in the cloud 406. When the user registered with sSSO 408, sSSO 408 requested additional data from the user that could be used in identifying the user at subsequent points in time. Types of such data include but are not limited to user data, passwords, mobile data, questions and answers, biometric data, and social data. sSSO 408 stores such data in a second repository 414 via a distributed directory information service over an Internet Protocol (IP) network 412 such as for example a Lightweight Directory Access Protocol (LDAP) system 412. These user names and other data stored in repository 414 and accessible via service 412 are invisible and inaccessible to the users. Thus, user 402 can login to sSSO 408 using any of her existing social usernames (as shown in repository 410) associated with the respective social login identity provider, which is linked to the user's secret data stored in repository 414. Then, after making the link, sSSO proceeds to verify the user by using any of such data in repository 414, such as for example, asking for a cell phone number or a asking a question and expecting a specific answer that matches a stored answer.

Social Federation Social Single Sign-On

Social Federation social single sign-on ("sFed") can be a system, API, or service that enables an organization such as a company, a university, or a government agency, etc. or end user to easily and securely enable an external party such as a contractor, vendor, alumni, family, friends, etc. access to internal (private) and external (public) web applications without using traditional federation technologies or manually requiring setting up a new user name and password. sFed combined with sSSO easily and securely shares web site login-related data with any user who already has a username and password on a login identity provider website.

An embodiment of the invention can be understood with reference to FIG. 5A. FIG. 5A is a flow diagram of a process for registration to a social federation system. To use the sFed system requires an external party to register in sSSO or any registered sSSO user to invite an unregistered sSSO user. After they have been registered, the sFed system detects sSSO registration and registered login identity provider user name. Using the sFed system, API, or service, the organization sFed administrator or a sSSO user can delegate (share) sSSO enabled web applications to a registered user or invite an unregistered sSSO user which automatically registers the user into the sSSO system by requiring the invited user to login once to the sSSO system using a login identity provider user name. For example, FACEBOOK: Julie@yahoo.com registers on sSSO and sFed verifies her identity by sending her a SMS token, or question associated with an expected (Q/A), or requiring a biometric confirmation. Thus, in an embodiment, requiring a user to remember and enter login informational data is not needed. sSSO is configured to transmit an alert to the user, where the user can respond with identifying-related data as discussed above.

Figure 5B:
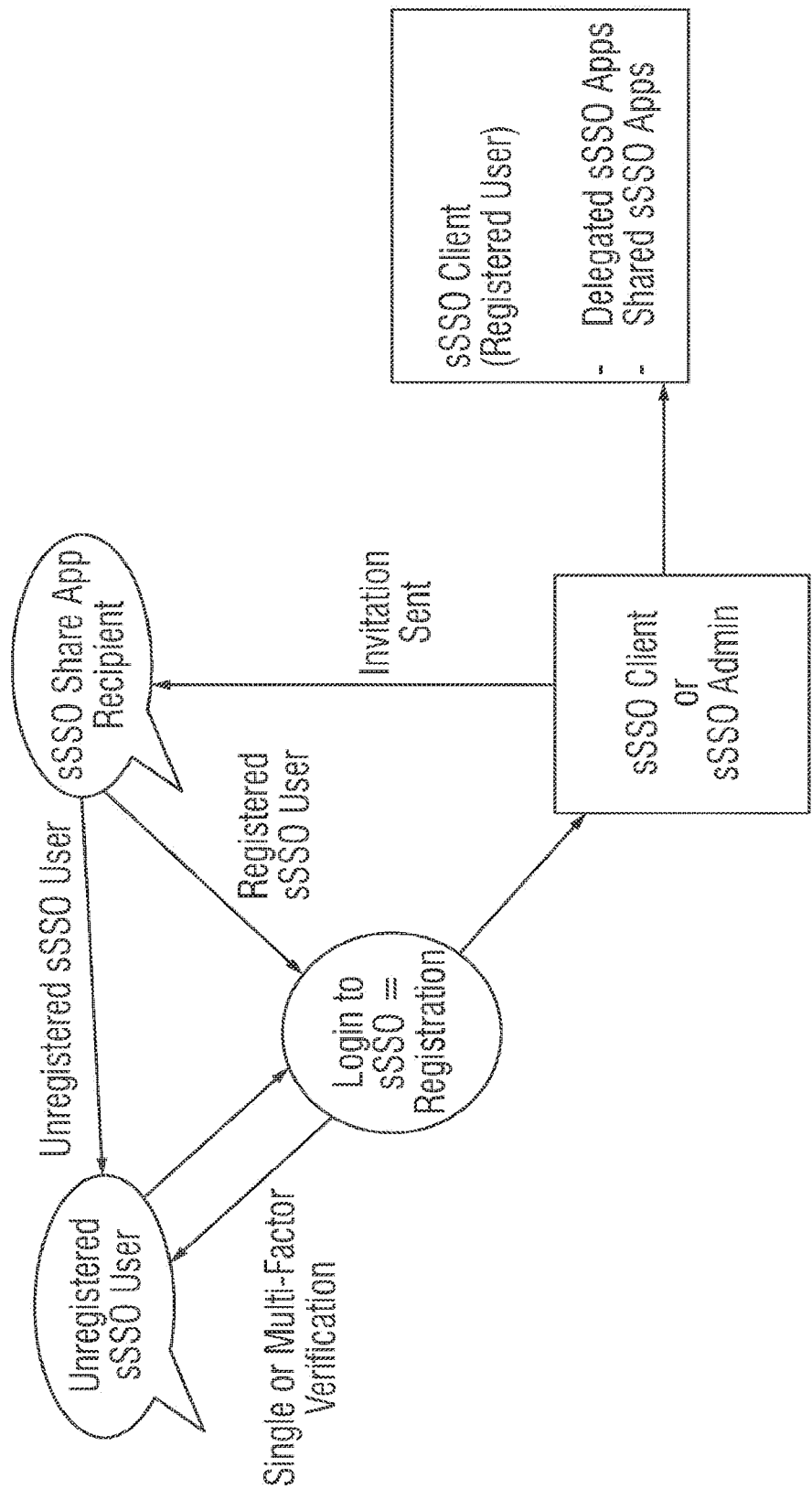
FIG. 5B is a flow diagram of a process for registration to an aggregator system, according to an embodiment.

An embodiment of the invention can be understood with reference to FIG. 5B. FIG. 5B is a process flow for registration to the sSSO system. A user such as an sSSO Client or sSSO Administrator sends an invitation to a recipient, e.g. sSSO Share App Recipient, for the purposes of sharing or delegating an application. If the sSSO recipient is already registered with sSSO, e.g. is a Registered sSSO User, then when such sSSO recipient logs in to sSSO and accepts the invitation, the delegated application is added by the sSSO system to the recipient's collection of sSSO applications. If the sSSO recipient is not yet registered with sSSO, then with the invitation, such recipient is provided the opportunity to register with the sSSO system by providing single or multifactor verification data. Subsequently, the recipient is a registered sSSO user and the application is added to such user's collection of sSSO applications.

In an embodiment, sSSO enables a user to share login capability along with sharing an application.

Figure 6:
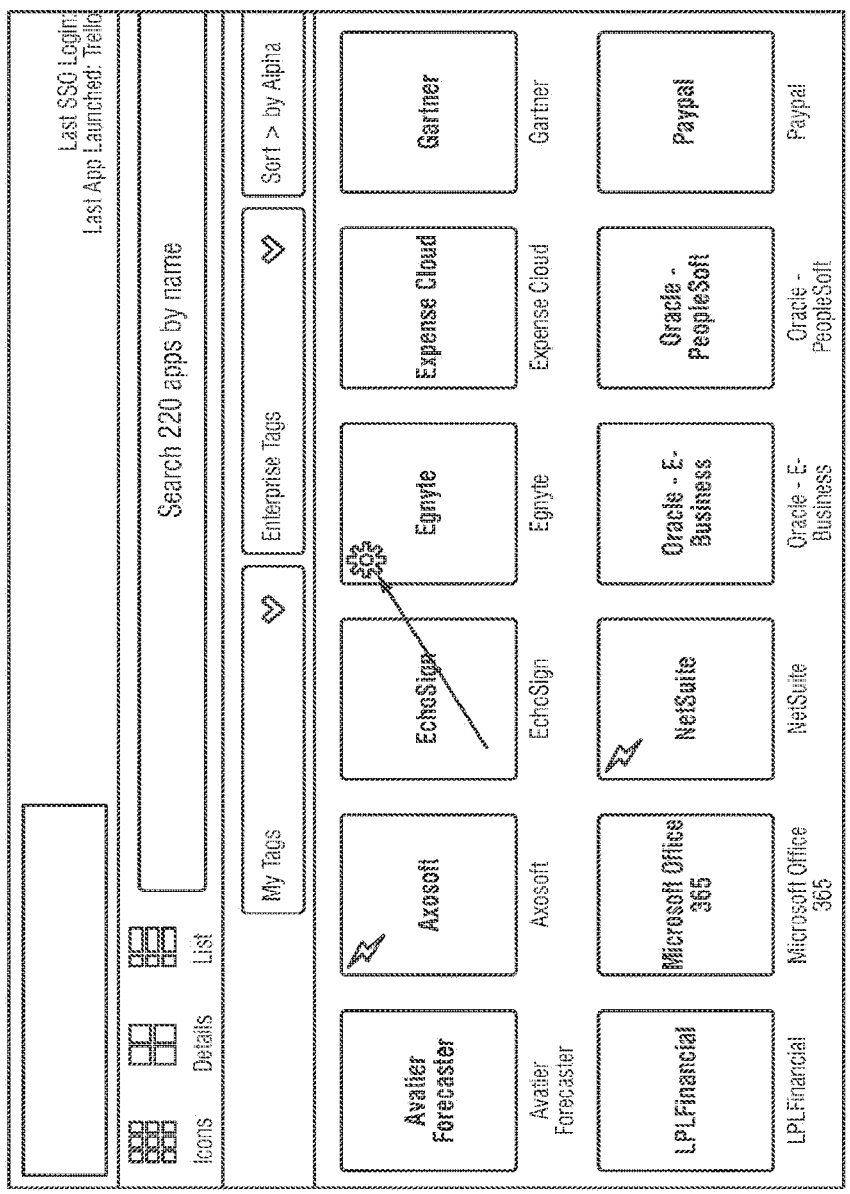
FIG. 6 illustrates an example of a user interface showing an SSO user sharing an application with an unregistered or registered SSO user, according to an embodiment.

FIG. 6 is a sample user interface showing an SSO user sharing an application with an unregistered or registered SSO user. The user initiates the process for the selected SSO application, e.g. Egnyte, by clicking on the icon.

Figure 7:
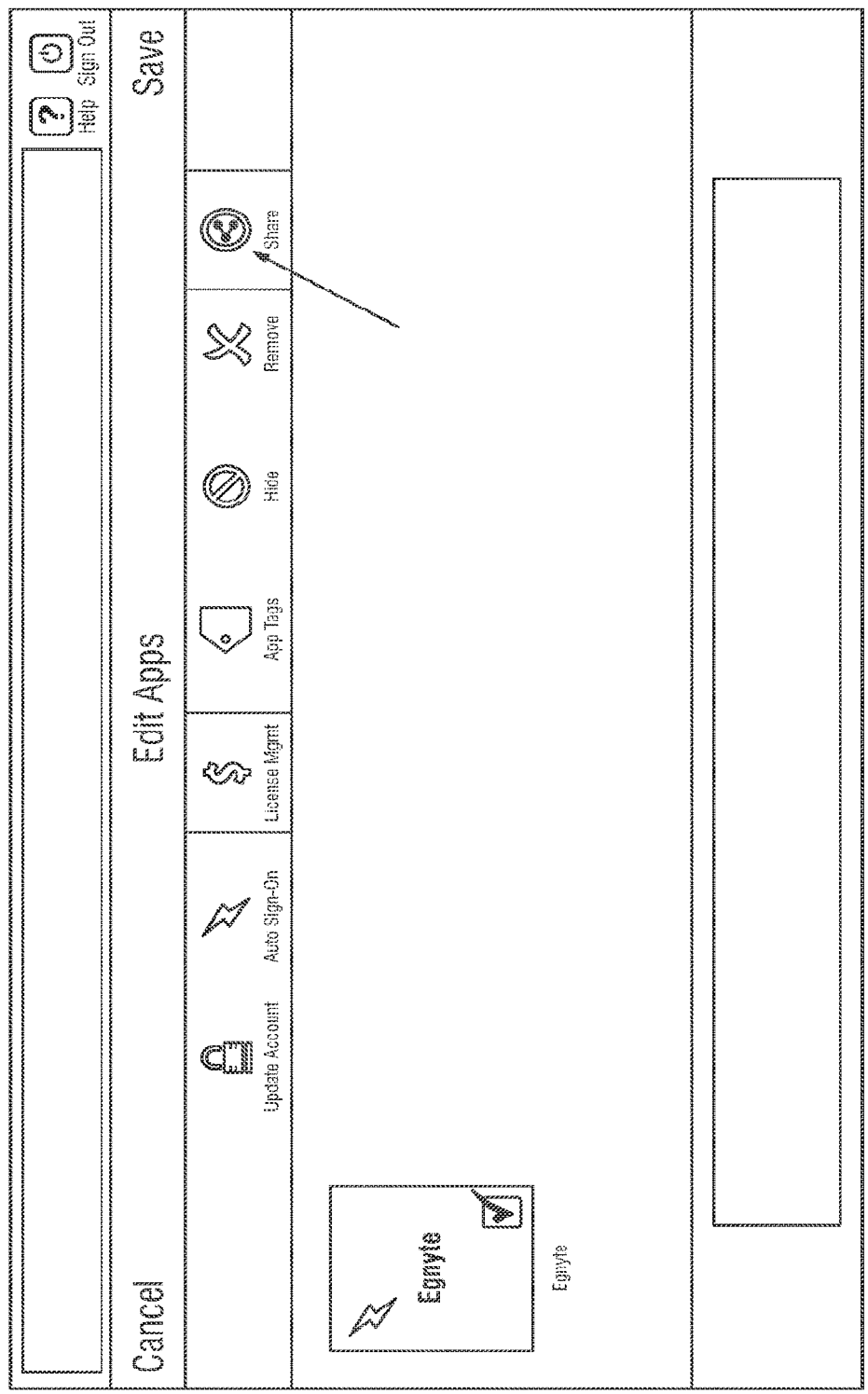
FIG. 7 illustrates an example of a user interface showing a user has selected a Share command to send to a recipient user.

FIG. 7 is a sample user interface showing a user has selected a share command to send to a recipient user. The share command can be sent via multiple methods including but not limited to email, SMS, social network, copying, etc.

Figure 8:
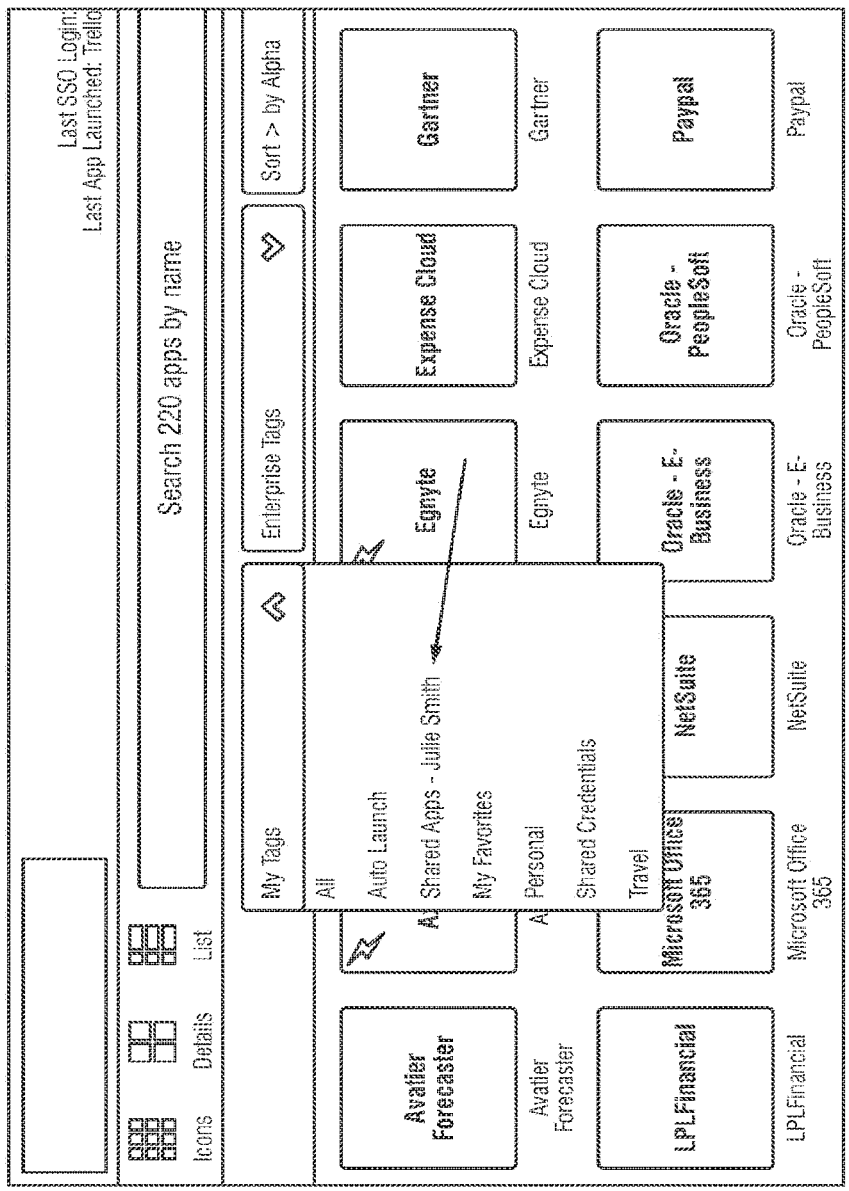
FIG. 8 illustrates an example of a user interface showing how after the SSO user proceeds with registration or log in to SSO, the system provides the user the capability of seeing his shared SSO applications, according to an embodiment.

FIG. 8 is a sample user interface showing how after the SSO user proceeds with registration or login to SSO, they subsequently have capability of seeing or accessing shared SSO applications. For example, the user can access the shared applications by selecting a drop menu that contains a link to a shared apps page. In this example, the system provides a link to shared applications for each recipient.

Figure 9:
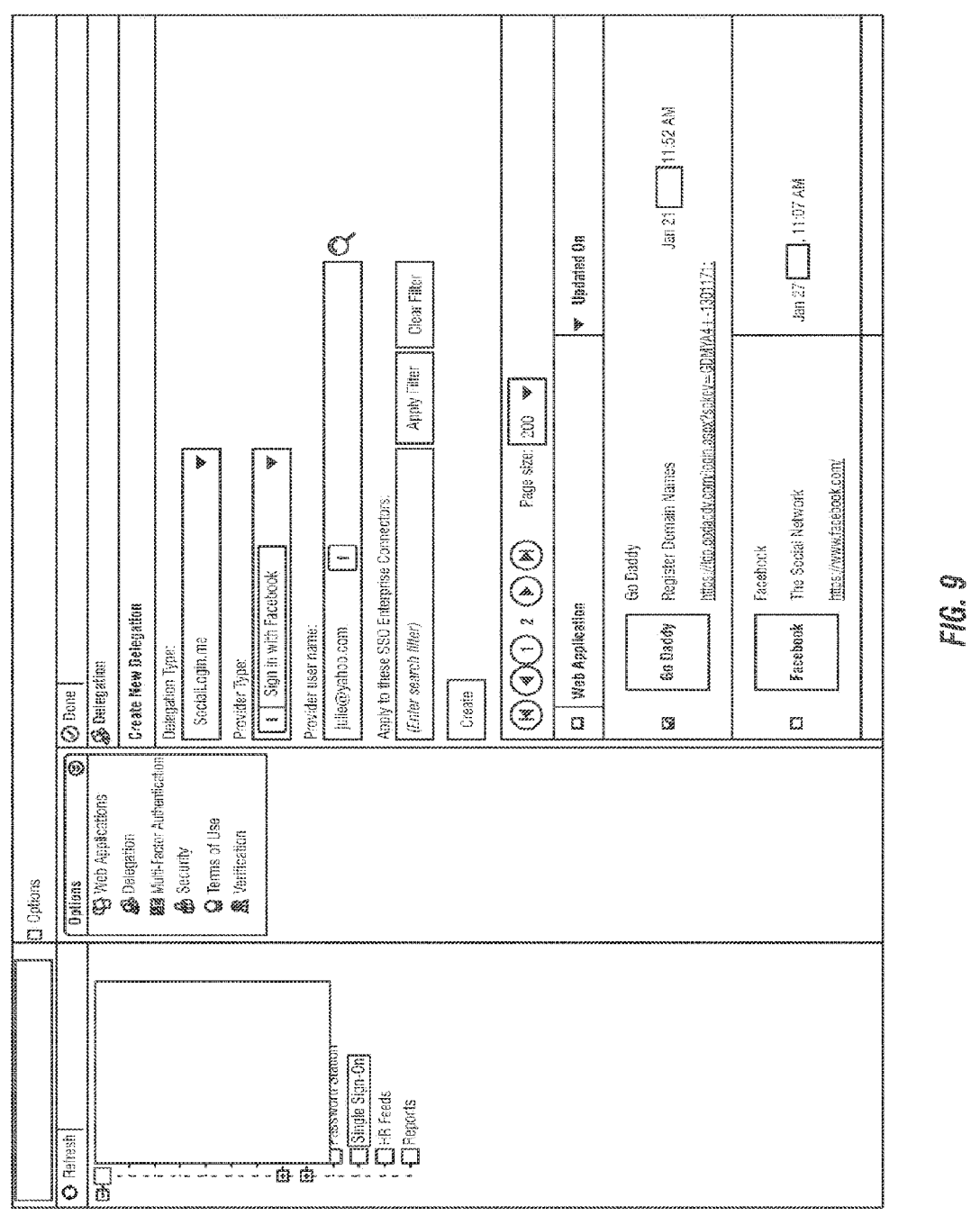

An embodiment provides a sSSO delegation administrator model and corresponding functionality. An administrator can delegate a particular sSSO user to a particular sSSO application, as shown in FIG. 9 for example. FIG. 9 is a sample user interface of a delegation page in which a user can enter a delegation type, e.g. SocialLogin.me, provider type, e.g. Sign in with Facebook, a provider user name, e.g. Julie@yahoo.com, applicable filters, and a selection of one or more applications to share, e.g. Go Daddy.

Figure 10:
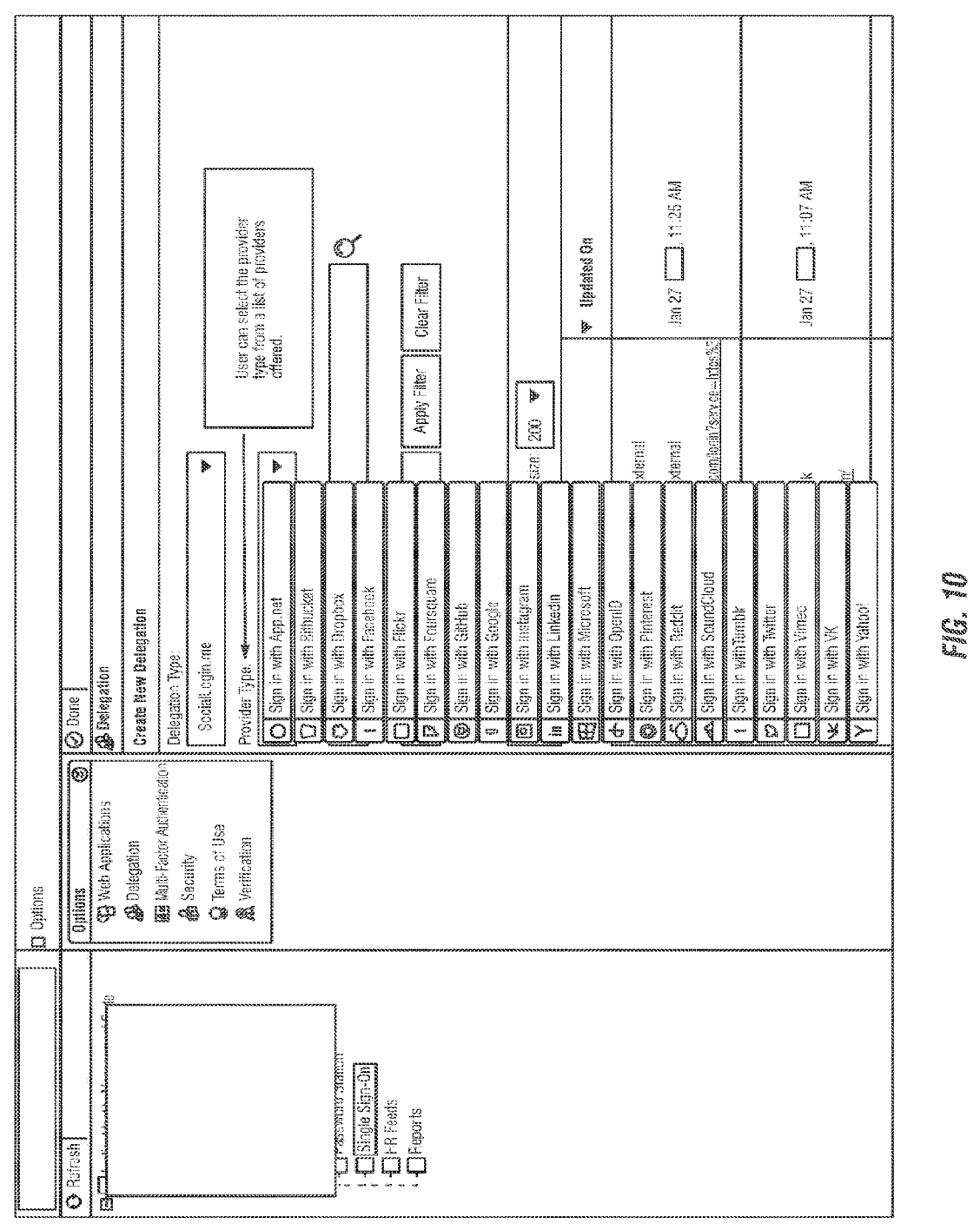

FIG. 10 is a sample user interface showing a non-exhaustive sample dropdown list of the provider types of FIG. 9, each selected type enabling the user to sign in to sSSO and/or sSSO's various enabled web applications or sSSO enterprise connected applications.

If the sFed administrator or sSSO end user is delegating (sharing) a SSO enabled web application, that is using a fixed username and password or a known user name and password to multiple people or shared within the organization to the sSSO user, then system is configured to cause the shared web application to automatically appear on the sSSO users' sSSO interface. For example, sFed uses an API or direct database calls to add the new SSO enabled web application to the user's sSSO interface.

If the sFed administrator is delegating a SSO enabled web application that is using a username and password that is unique to the sSSO user, then sFed automatically creates a user name and password on the enabled web application. For example sFed can use a format for exchanging authentication and authorization data between parties such as between an identity provider and a service provider, e.g. Security Assertion Markup Language (SAML). Or sFed can use internal methods. Then the SSO enabled web application automatically appears enabled on the sSSO user's sSSO interface.

Web Crawler for Applications Requiring Logons

A technique is introduced by which a web crawler system crawls for web applications that require logons, regardless of content. Each identified web application is added to a database, such as for example the sSSO databases 410 or 414, of such type of applications. In accordance to one technique, the web crawler system discovers a web application and then attempts to logon to the application with a bogus ID and a bogus password. If the attempt is unsuccessful, the web crawler system creates a definition for the web application, where the definition defines attributes of the web application. The web crawler system uses these attributes to categorize the web application within the database. Based on matching the categorization and user profiles, the web crawler system offers the web application to a particular user to add the web application to the user's aggregation of web applications. For instance, the web crawler system can display or send a message to the particular user indicating, "You like bicycles. Perhaps you'd like to add this bicycle application ('bikeapp.com') to your aggregated applications."

Alternate Embodiments

Figures 11, 12:
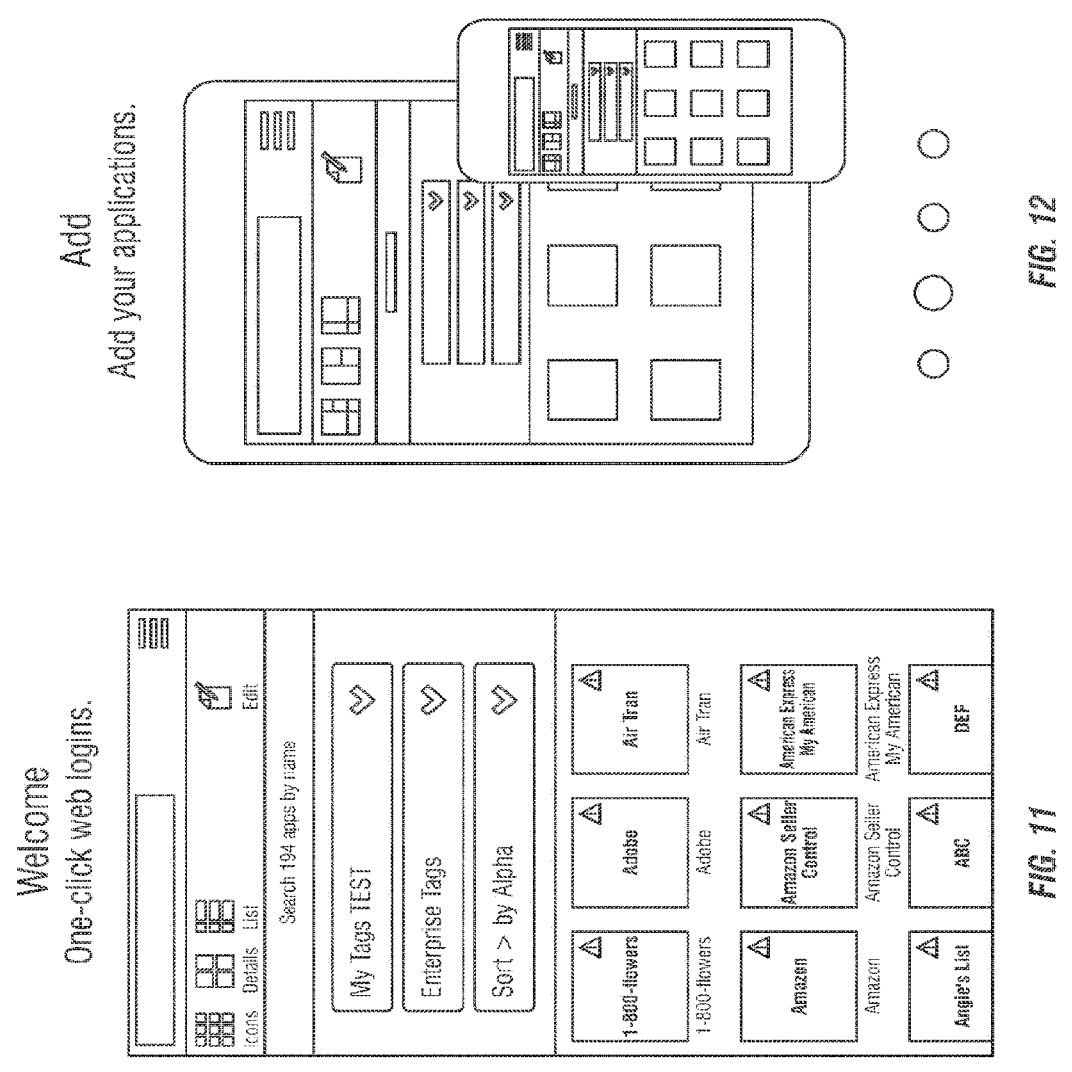
Figure 13:
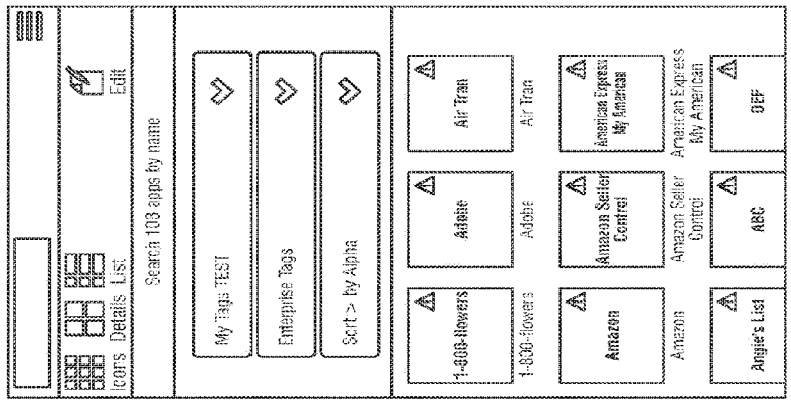
FIG. 13 illustrates an example of a user interface showing four web applications that a user can configure to add to his aggregator system, according to an embodiment.
Figure 14:
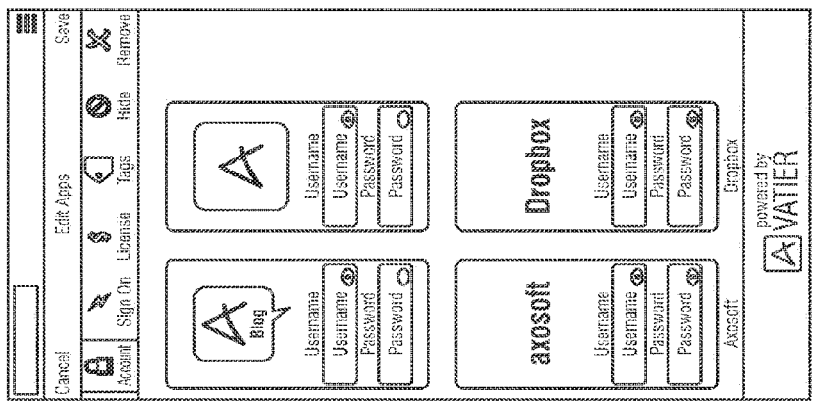
FIG. 14 illustrates an example of a user interface showing icons representing web applications which were added to the system and from which the user can launch with just one click, according to an embodiment.

A smartphone or tablet paradigm or environment illustrates how the innovation solves the technical problem of using computer network resources and bandwidth efficiently by streamlining user interactions with the network. FIG. 11 illustrates an example of a user interface showing a home page of the aggregator system. FIG. 12 illustrates an example of two different devices, a tablet and a smartphone, each displaying the home page web page of the aggregator system. FIG. 13 illustrates an example of a user interface showing four web applications that a user can configure to add to his aggregator system. FIG. 14 illustrates an example of a user interface showing icons representing web applications which were added to the system and from which the user can launch with just one click.

For any new device and in particular for the devices shown, the innovation streamlines user interactions with network, because the user does not need to download and reenter a user ID and password for each of the user's applications. With the technique introduced herein, the user can launch any application already registered in the aggregator platform with a single click, for instance as shown in FIG. 14.

A further efficiency, among others, is afforded the technique introduced here by enabling a user from any device the ability to login with one click to the aggregator system, e.g. as shown in FIG. 11.

A further efficiency is afforded the technique by allowing the user, in addition to launching with one click to a designated application, to add and configure a new application to his already registered applications, as shown in FIGS. 12 and 13.

An Example Machine Overview

Figure 15:
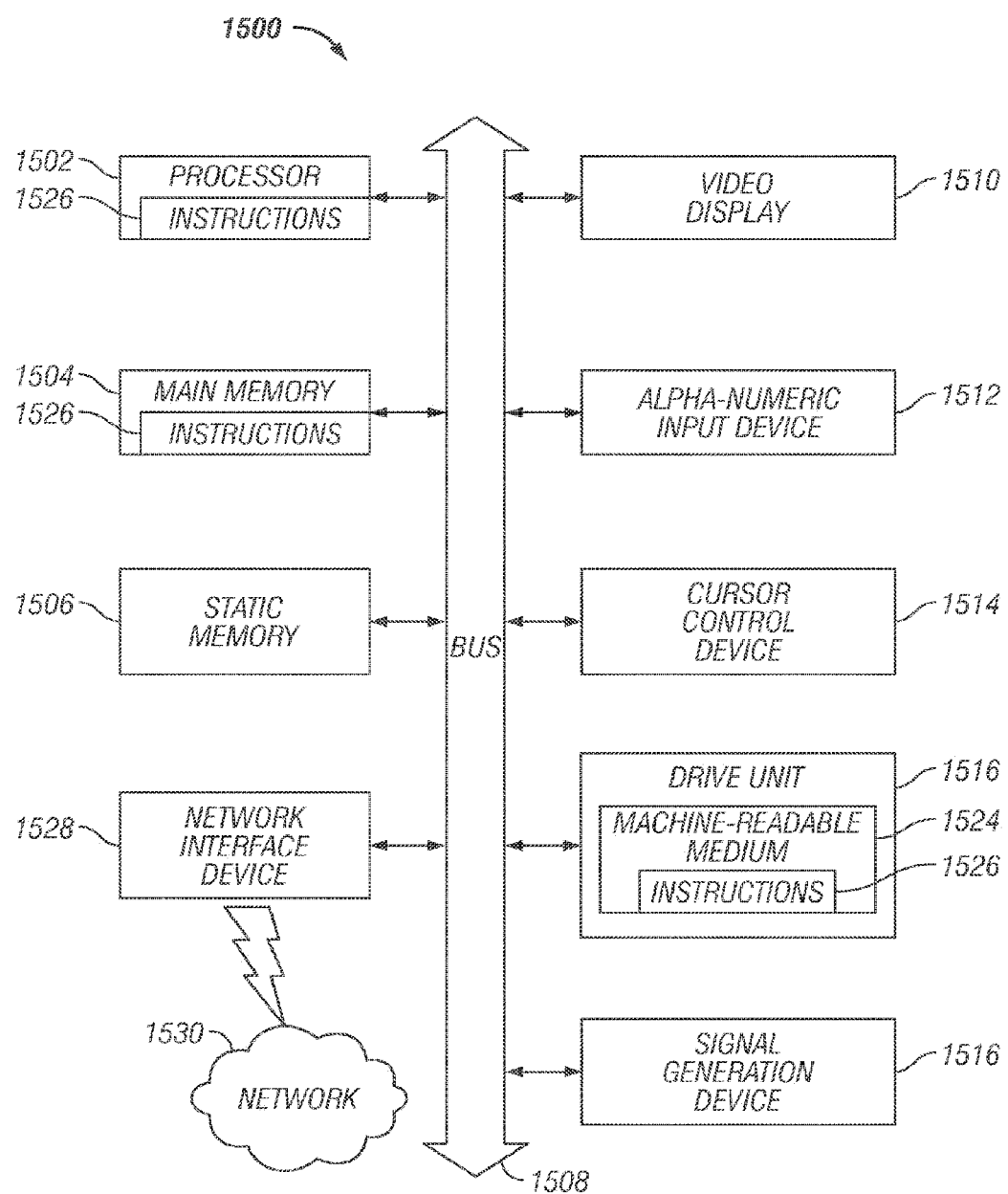
FIG. 15 is a block schematic diagram of a system in the exemplary form of a computer system according to an embodiment.

FIG. 15 is a block schematic diagram of a machine in the exemplary form of a computer system 1500 within which a set of instructions may be programmed to cause the machine to execute the logic steps of the invention. In alternative embodiments, the machine may comprise a network router, a network switch, a network bridge, personal digital assistant (PDA), a cellular telephone, a Web appliance or any machine capable of executing a sequence of instructions that specify actions to be taken by that machine.

The computer system 1500 includes a processor 1502, a main memory 1504 and a static memory 1506, which communicate with each other via a bus 1508. The computer system 1500 may further include a display unit 1510, for example, a liquid crystal display (LCD) or a cathode ray tube (CRT). The computer system 1500 also includes an alphanumeric input device 1512, for example, a keyboard; a cursor control device 1514, for example, a mouse; a disk drive unit 1516, a signal generation device 1518, for example, a speaker, and a network interface device 1528.

The disk drive unit 1516 includes a machine-readable medium 1524 on which is stored a set of executable instructions, i.e. software, 1526 embodying any one, or all, of the methodologies described herein below. The software 1526 is also shown to reside, completely or at least partially, within the main memory 1504 and/or within the processor 1502. The software 1526 may further be transmitted or received over a network 1530 by means of a network interface device 1528.

In contrast to the system 1500 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Further, it is to be understood that embodiments may include performing computations with cloud computing. For the purposes of discussion herein, cloud computing may mean executing algorithms on any network that is accessible by internet-enabled devices, servers, or clients and that do not require complex hardware configurations, e.g. requiring cables, and complex software configurations, e.g. requiring a consultant to install. For example, embodiments may provide one or more cloud computing solutions that enable users, e.g. users on the go, to login to sSSO web applications using social network identity providers or share sSSO web applications anywhere on such internet-enabled devices, servers, or clients. It further should be appreciated that one or more cloud computing embodiments include allowing a user to login to sSSO web applications using social network identity providers or share sSSO web applications using mobile devices, tablets, and the like, as such devices are becoming standard consumer devices.

An Exemplary Unified Risk Score Implementation

In an embodiment, a computer generates a consumable unified risk score using a risk aggregation engine. A consumable unified risk score may include data from across the many different information technology ("IT") systems that exist in the world. In an embodiment, the unified risk aspect is added or integrated into an aggregated identity system, enabling risk to be viewed and analyzed more globally. By such configuration, unified risk score generation is a service that is consumable by cloud applications or businesses, and so on. Contemplated is a global risk provider service that can be grown into widespread adoption, due to the system receiving and storing data points from within every corporation or other entity. The innovation enables a risk score to be consumed by others by allowing enterprise systems to couple with the technique's risk aggregation engine so that risk can be consumed in the other systems.

Everything has a risk. For example, within a large corporation, risk exists in many different places. For example, within a large organization, a user may have risk associated to the accounting application that the user is running. Further, that accounting application, when the user has the ability, e.g. access and entitlement, via the accounting application to print checks, might be a higher risk than when the accounting application allows the user to view a report, e.g. of vendors from accounting system. Thus, there may be a needs for two different risk scores for those individual items. Thus, there is risk in everything individuals or systems do and, in this discussion, such activities is referred to as entitlements or privileges, or access to specific applications and physical entities. There can be risk associated within the entitlements such as with specific accesses within applications. As mentioned previously, there is also risk in physical things, such as for example, a badge to get into a user's office door. Such badge might be a lower risk than a badge to get into the server room which might be a lower risk than the badge to get into the accounting office. Thus, everything has risk associated with it.

In an embodiment, a unified risk score is assigned to entities on premise and now on the cloud, e.g. one or more servers on the Internet. The innovation includes scoring unique items that are on premise that have risk. However, in addition, techniques herein implement this concept to apply to the cloud. Consider, for example, a web site, e.g. XX.com, where their vice president (VP) of sales may have access to all customer and new leads. Such VP may have a higher risk because of their access. Such VP may work with a person who has access just to a single territory, e.g. North Carolina, if they are managing North Caroline. Such employee may have a lower risk in accordance with integrated predetermined company rules. Thus, there is not just risk that exists on premise, but risk that exists in the cloud. In an embodiment, that risk can be assigned on premise. However, it is much more advantageous over the prior art that an embodiment enables the cloud to consume such risk. For instance, suppose a a person logs on to a system and, specifically, to IT or business support, and indicates they "need access to all customers because our IT department bought that." Clearly, it would be a great improvement to the prior art, which only provides a risk score for individual items and not generated in real time, if there could be a risk issued to that person dynamically in real-time.

Risk also exists in other attributes. Risk goes beyond the two attributes, on premise and cloud, described above. That is, risk not only exists on premise, entitlements and access, and not only in the cloud, e.g. inside a user's application, but risk also exists in other attributes. For example, risk can exist in the account that a user uses to access these aforementioned systems. For example, when a user logs into their network, the user may have not changed their password for 90 days. For some people or organizations, that may be a higher risk than if the user had changed their password five days ago. Likewise, the user may have configured their computer such that their account never expires, or the user may be a system administrator of a Unix box or of an active directory environment. In other words, there are other types of risk. In an embodiment, such risk is referred to as account property risk which contains information about the account property, e.g. when the account expires, that the password never expires, that the user cannot change password, etc. These examples are very specific account properties, log-on account properties, specifically.

Also, there are other types of risk, such as for example the risk associated with a person's title, the department to which the person belongs, and the location at which the person comes to work. For instance, if a user works in Area 51, the user's locational risk might be high because the user works in a place that the user has to fly in and the existence of which the government denies. As another example, if a user is in the finance department and performs mergers and acquisitions, then that department might have a higher risk than the department to which the user belongs and for which the user pays bills.

The type of risk can be context dependent. While risk exists everywhere, the computation of risk can be different for every organization. Every organization needs to think about the risk in context of their business and their business operation. For example, a bank has a different set of risks a dentist's office, although they both have risk. Risk can exists in the business, itself. For example, in terms of the financials of the business, the business should be aware of all the risks to protect its investments and resources.

Risk exists in the environment. For example, in an earthquake, if a premise does not have backup generators and other relevant objects or services, the environment can have a power outage, which can negatively impact many things. A business might not still run if the power goes out.

Risk exists in technology, which includes many resources from fire scans, to backups, to firewalls, and so on.

Now, social risk exists. That is, risk now exists outside of the business in a social environment, such as for example, a social network or in a social group. For example, someone can start badmouthing the CEO of a company, claiming that they did something bad or can start badmouthing the company, that the company neglects dealing with x, y, z. The accusation may be unfounded, untrue. Thus, risk exists everywhere.

An embodiment enables a user, e.g. a company, to devise a strategy and include weights. The user needs to understand their risk and devise a strategy. As mentioned previously, an embodiment can focus on the IT side of risk. Good examples of the types of risk that exist were discussed above. However, a business might realize or state that locational risk is the most important risk. An embodiment computes the unified risk score of the person or user based on a weighting defined for the types of risk. For example, the weighting can be assigned based in part on the importance of the type of risk, the frequency with which that type of risk occurs, or information, such as profile information, about the person or user gleaned from obtaining the person or user's aggregated identity from the aggregator platform described above.

In an embodiment and as an example, a user of the system such as an administrator can move the weighting up on locational risk to a higher risk. Such movement can affect the scoring of the target user's overall risk. Thus, an embodiment allows businesses to control generating the unified score risk, because business typically consider risk in the context of their business and it would be beneficial for a business to be able to control how risks are weighted. For instance, an embodiment provides movable sliders which can be moved around a scale for the different points of IT risk that is being scored. That is, an embodiment enables a user such as an administrator to weight a certain attribute of risk higher than other attributes of risk.

In an embodiment, the number of risk attributes vary and the weight per risk attribute varies. For example, if a password never expired, a system user may move that type of risk to 100 percent of the risk, that risk attribute. However, if the user is weighing 10 items total and move that particular risk to 100 percent, then the system gets at most 10 percent of that item when the system is configured for 10 items. If the system is configured for four items, then 100 percent of that particular risk is 25 percent of the unified risk score. Thus, the balance of that risk can be weighted higher or lower based on predetermined business, however the impact of the unified risk score changes accordingly, based on how the business weights it.

In an embodiment, the unified risk score is aggregated across several points of data. The system takes as input an aggregate risk across several points of data and computes a unified risk score. Now that risk score could be 27. That risk score could be 59. The risk score could be 92. Twenty-seven doesn't mean low risk. The user, e.g. the company, organization, or individual, defines the meaning of the value of the score. For example, the company can define a band, a spectrum. In accordance with an embodiment, the company can create a band of risk colors, e.g. green, yellow, and red, and the company can configure where within the spectrum they want the banding to occur. Thus, by way of the innovation, a user can look at risk, e.g., for print checks or access to the server room and can also look at risk as an aggregate, across everything.

An embodiment computes, stores, and uses points of risk in the aggregate or unified risk score. Suppose for example an individual has 28 points of risk, everywhere from passwords, to entitlement risk, to department risk. Such individual might be considered to have too many entitlements. Such individual might have more entitlements than other people in their department or might have more than other people in the company. The entitlements are data points in the system. By way of the innovation, an end-user can view the computed aggregate score and can determine, for example based on predetermined definitions, what the numbers of risk should concern the end-user. For instance, if the unified risk score is above a 60, that may be a high risk. If such score is between 40 and 60, that may be a medium risk. Anything under a 40 may be a low risk. Additionally or alternatively, such scores can be displayed in colors: a score with a red background color can be a high risk; a score with an orange background color can be a medium risk; and a score with a green background color can be a low risk. It should be appreciated that the unified risk score is an aggregate score and should not be implemented as score for an individual entitlement.

An embodiment does not include exceptions into the computations. The system computes the aggregate risk based in part on many points of risk. Uniquely, if a particular item associated with a particular criterion is not filled in, then such instance of that criterion is not used in the computation of the aggregate risk. For example, assume there is a risk corresponding to a title and the risk has been increased up to 25 percent of the unified risk score. Support a target person has VP in their title, but did not have it set. Then, the system does not calculate that risk in the aggregate risk score. Likewise, if the system was configured such that a password never expiring as a risk element, but an individual's password is set to change, then such risk element will not be calculated in the final risk score.

In an embodiment, risk dynamically changes and is intelligent and can evolve. The points which are monitored by the system are dynamically changing based on the target individual being looked at. For example, in an embodiment, risk weight can change as time increases. The risk score evolves. For example, suppose the age of the password is a risk element. The risk score can evolve based on when the target user changed their password. Thus, for a password where the password is greater than 90 days, the weight of the password days can change, e.g. further out in time. For instance, suppose at first the risk element is rated at 10 percent, it can go up to 25, 30, 40, 50, to 100 percent of its one piece or point the older the password.

The system is continuously analyzing. For instance, the system can continually, periodically, or based on a schedule, read risk element criteria as predefined or changed by a controlling entity, for example in a predetermined set of rules and corresponding data, and can read in real-time or batch, attribute data and values corresponding to the defined risk element criteria. Based on this input information, the system computes the aggregate, unified risk score.

Figure 16:
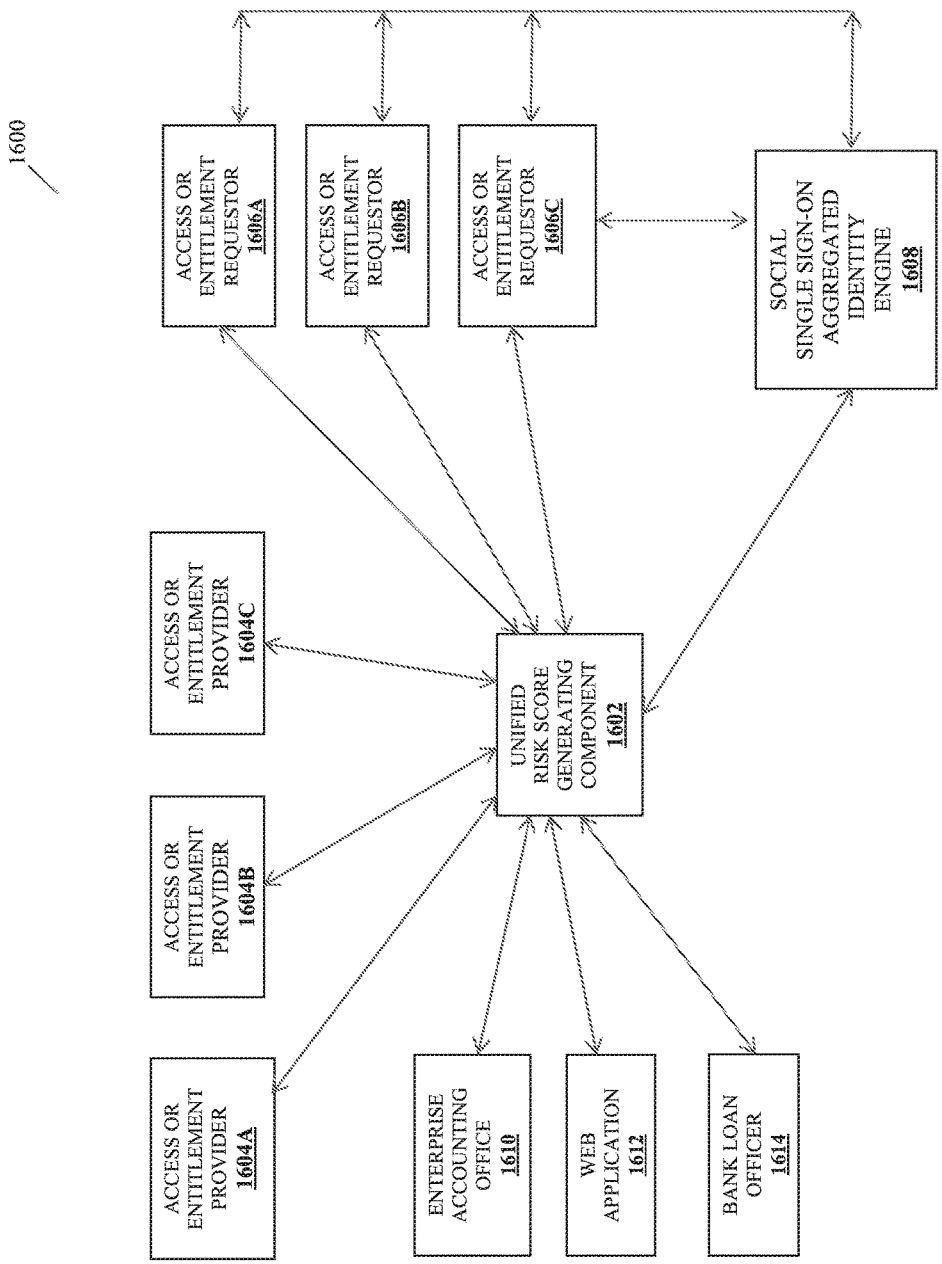
FIG. 16 is a block schematic diagram of a unified risk score generating environment showing how the unified risk score component interacts with access and entitlement requestors, access and entitlement providers, the social single sign-on aggregated identity engine, and various external partners, according to an embodiment.

FIG. 16 shows an exemplary architecture 1600 for the integration of various components of a unified risk score generating environment showing how the unified risk score component 1602 interacts with access and entitlement requesters 1606A-C ("1606"), access and entitlement providers 1604A-C ("1604"), the social single sign-on aggregated identity engine 1608, and various external partners (1610, 1612, and 1614), according to an embodiment. Access or entitlement requestor 1606 can make a request to the unified risk score generating component 1602 for access to an entity such as a web application or for an entitlement such as a request for a badge to enter the company's building. Alternatively, request 1606 can make the request via logging in to component 1602 via the social single sign-on identity engine 1608 without user a username or password, as described in detail above.

In an embodiment, unified risk score generating component 1602, upon receiving the request from requestor 1606, computes a unified risk score corresponding to requestor 1606 and transmits the score to an entity causing the entity to determine whether to allow or decline the request or request further information based on the particular request and score. For example, unified risk score component 1602 can transmit the score back to requestor 1606 to cause requestor 1606 to make the decision based on predetermined rules. In another embodiment, unified risk score component 1602 can transmit the score automatically to a door sensor communicably connected to a controller for an enterprise account office 1610 and cause the controller to cause the sensor to unlock the door for an identification code previously associated with requestor 1606. In another example, unified risk score component 1602 can access web application 1612 automatically and in real-time to obtain values for predetermined criteria and use such values in computing the unified risk score. As another example, unified risk score component 1602 can transmit the score to a bank loan officer 1614, because requestor 1606 for score was initiated automatically when a person was filling in a home equity line of credit application.

In an embodiment, access or entitlement provider 1604 configures the predetermined rules and weighting based on criteria as defined by business entities and the like, as discussed above.

An embodiment can be understood with reference to FIG. 17A-F, schematic diagrams illustrating various criteria and definitions concerning computing the unified risk score, according to an embodiment.

An embodiment provides a configured unified risk service that collects specific information. For example, FIG. 17F shows that the unified risk service engine is configured to collect user provisioning information at the individual and group level; access governance information related to compliance and group enforcement; service catalog information related to a catalog of offered services and workflow management applications; and password management information, including identity information from the aggregator shown in FIG. 16, social single sign-on aggregated identity engine 1608.

Figure 17A:
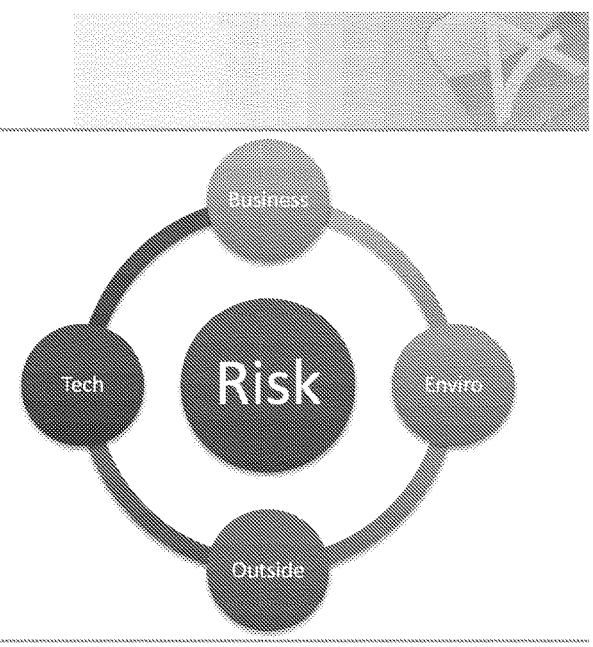

FIG. 17A shows considerations for defining risk. FIG. 17B shows a user of the system can avoid risk; transfer risk; or you can reduce risk. It should be appreciated that entities typically do not avoid risk and many do not transfer risk.

Typically, people define risk reduction strategies. There are three different types of risk reduction, detective, preventative, and corrective. The innovation can be concerned with the detective side, but once the unified risk score is computed, preventative measures can be defined and programmed. Depending on how entities choose to work with the risk score, risk can also be remediated.

Figure 17C:
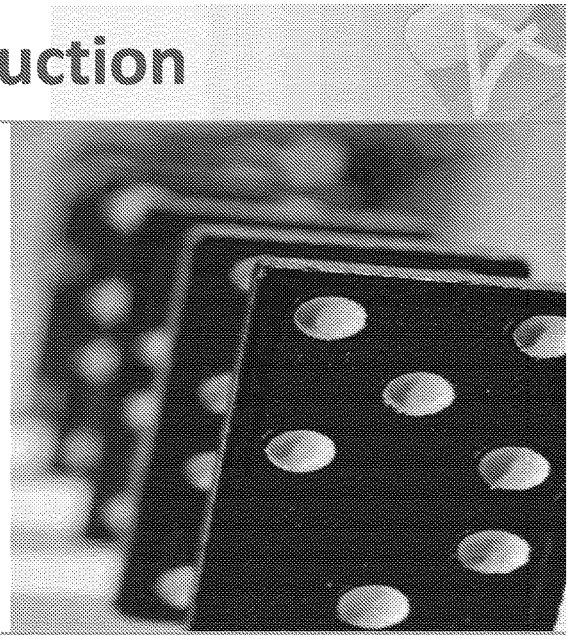
Figure 17D:

FIG. 17C illustrates how one driver in IT is identity management. Driving factors include identity management, service catalog password management, bring your own devices (BYOD) meaning mobile devices, bring your own cloud (BYOC), e.g. meaning a worker can bring their own cloud into the office. A person could bring their own cloud, like XX.com, and then could copy data from the office into the cloud. This has risk. As another example, a person can call the help desk and say, "I forgot my password." Without the innovation, without the ability to obtain the unified risk score for that person, the IT department might just reset the password. What if the person is a disgruntled CIO with access to a lot of very important and sensitive, confidential data. It should be appreciated that with prior art systems, what's causing this is risk is not integrated. The consequence or potential threat is there are identities, devices, and data silos of risk, as illustrated in FIG. 17D: there are risk ratings in attribute silos; unknown exposures to the silos is a risk, support process, technology complexity, no centralized alerting, no centralized reporting, no centralized auditing. Such mentioned conditions or consequences may mean great risk.

Figure 17E:
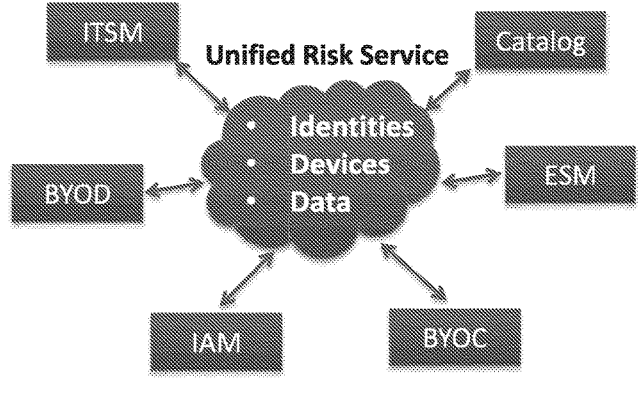
Figure 17F:
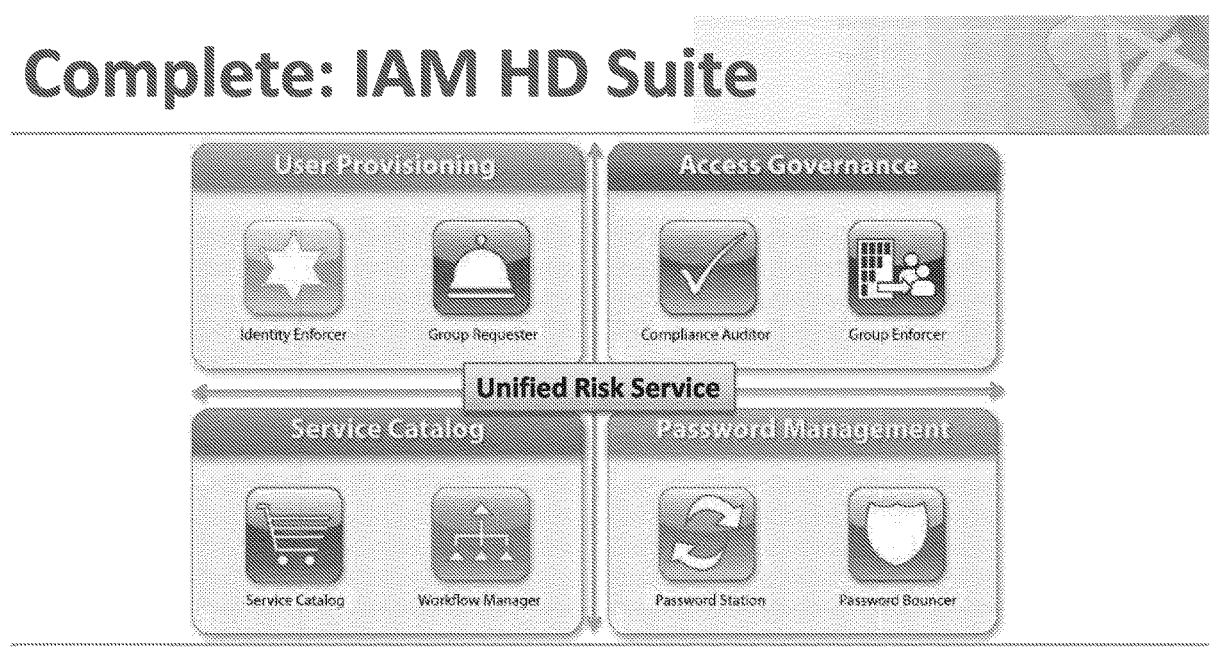

FIG. 17E shows a schematic of a unified risk service with an API, according to an embodiment. The service can run or execute on premise and can feed this information described above up into the cloud.

An enterprise's different systems have identities, devices or data, such as for example BYOC, ESM, Catalog, IT, and identity and management. In an embodiment, identity includes more than just accounts and access; identity also includes devices and data. Thus, identity management is bigger than just, "I know your account and your log-on ID, and I know what you have access to," which prior art systems might treat. Identity management in accordance with embodiments herein is beyond that. An embodiment provides request assurance using the computed unified risk score, as described herein. The score can be derived using data from the aggregated ID in databases described above, such as shown in FIG. 4.

An embodiment is configured to provide risk-trending analytics. For example, if a boss knows that the score for a specific employee is always around 75, the boss may want to see that score go down, if it can. Alternatively, a boss may want at least to be aware of, for example, the 75s or 90s are in their company.

An embodiment is configured to provide a corporate identity risk score. With the unified API discussed above, such score, for example for a Company A, can be pushed out to the cloud. Other organizations, such as Company B and Company C, can consume it. That is, other organizations can define rules and criteria for what a corporate identity risk score means or can refer to standardized rules. Based on the corporate identity risk score, the organizations can make certain decisions, such as for example, can determine whether to permit or deny a company with a low score access to its own web applications. For example, the system can generate a corporate identity risk score for Company A and can push such score out to Company B and Company C. In another embodiment, the system can cause Company A to be automatically denied connection to Company B and Company C, if Company B and Company C are opted-in to social single sign-on aggregated identity engine 1608.

An embodiment is configured to provide an individual's financial risk score. Beyond corporate identity, an organization can use the innovation as part of its financial protection. For example, it could be that every time a particular employee's credit cards get rejected because he uses them badly, the innovation causes a profile on the employee to adjust in real-time. The organization can start to build a risk score for employees, for example.

As another example, a target can be a member of an online resale store and they have never delivered a product. Thus, an embodiment can provide a risk associated with that. Or, the target can be very good at delivering products, and the innovation can compute a low risk for online commerce associated with this target, e.g. for the target to apply to sell items on another organization's web application.

It should be appreciated that such points of attribute can be unlimiting and can go beyond a corporate environment.

An embodiment provides transparency and accountability and supports the notion that an organization or user of the system cannot take action without a holistic definition of assignment, assets, services, and risk.

Thus, an embodiment pushing informational data out to the cloud and cloud and the cloud pushes back the score. Examples of data that goes out to the cloud include anything on which a measure of risk is desired. For example, the system may push a title, a department, a location, information about the password never expiring, and so on, out to the cloud. As another example, the system may push information about some of the entitlements another person has. Such information is encrypted. And, the cloud pushes back the score. As well, the cloud may push some attributes so that the receivers can consume whether to that organization, e.g. corporation, the risk is a high or low risk.

Figure 18A:
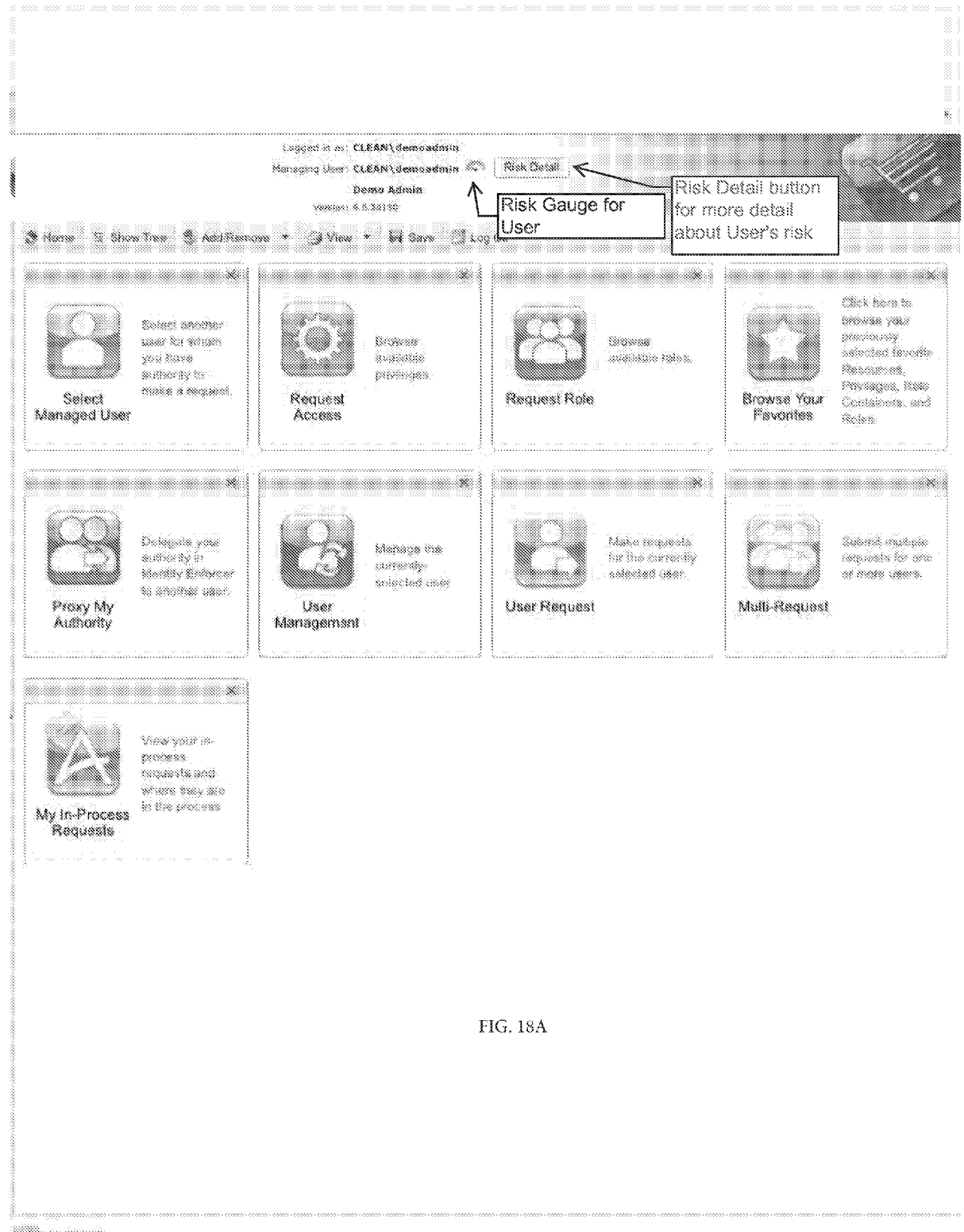
FIG. 18A-I are exemplary screen shots of an online application, the screen shots showing graphical iconic representations of an interface for requesting a person's risk, displays of computed aggregate risk scores, a risk source radar, defined scores for various badges, and a user interface for assigning risk weights, according to an embodiment.
Figure 18B:
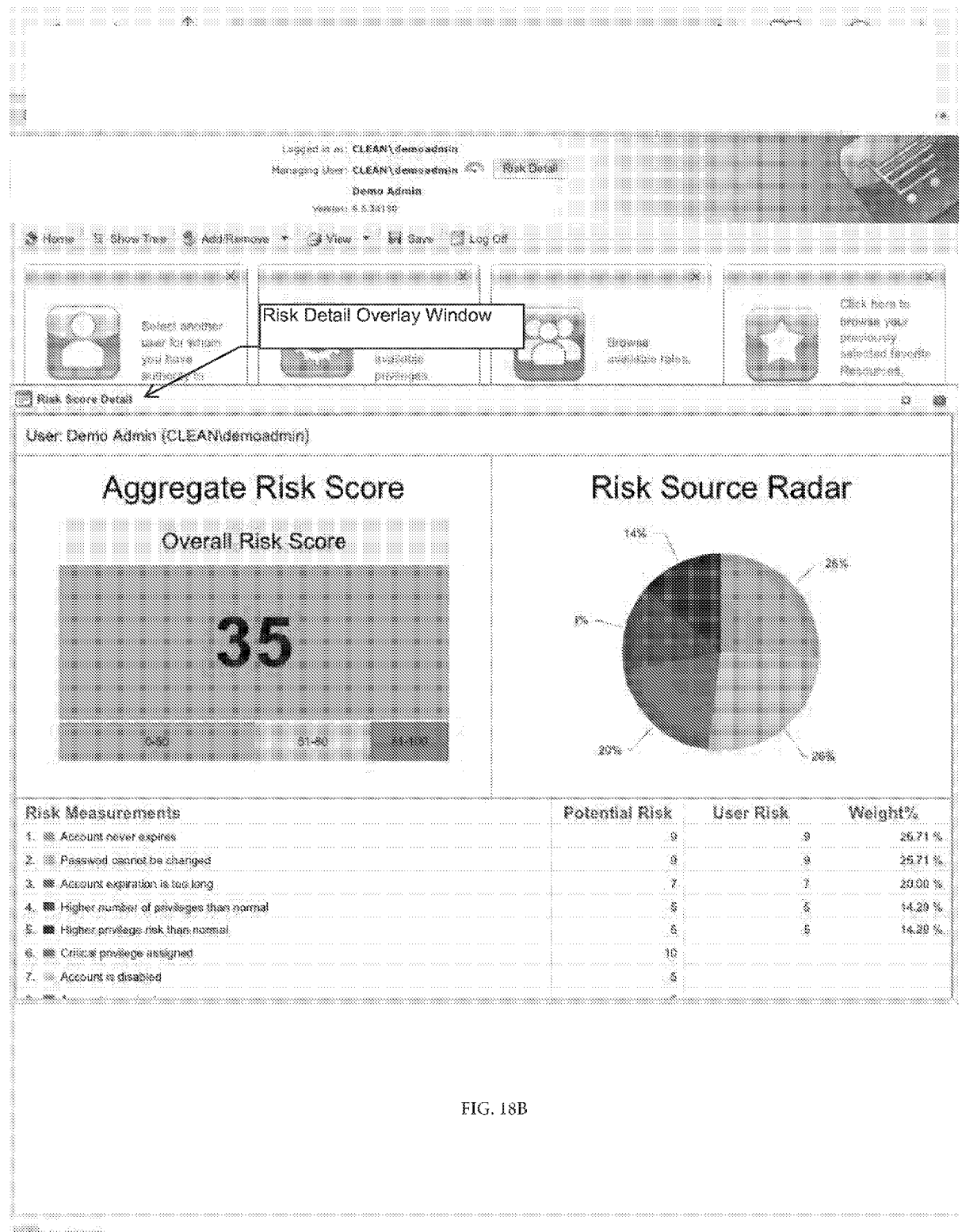
Figure 18C:
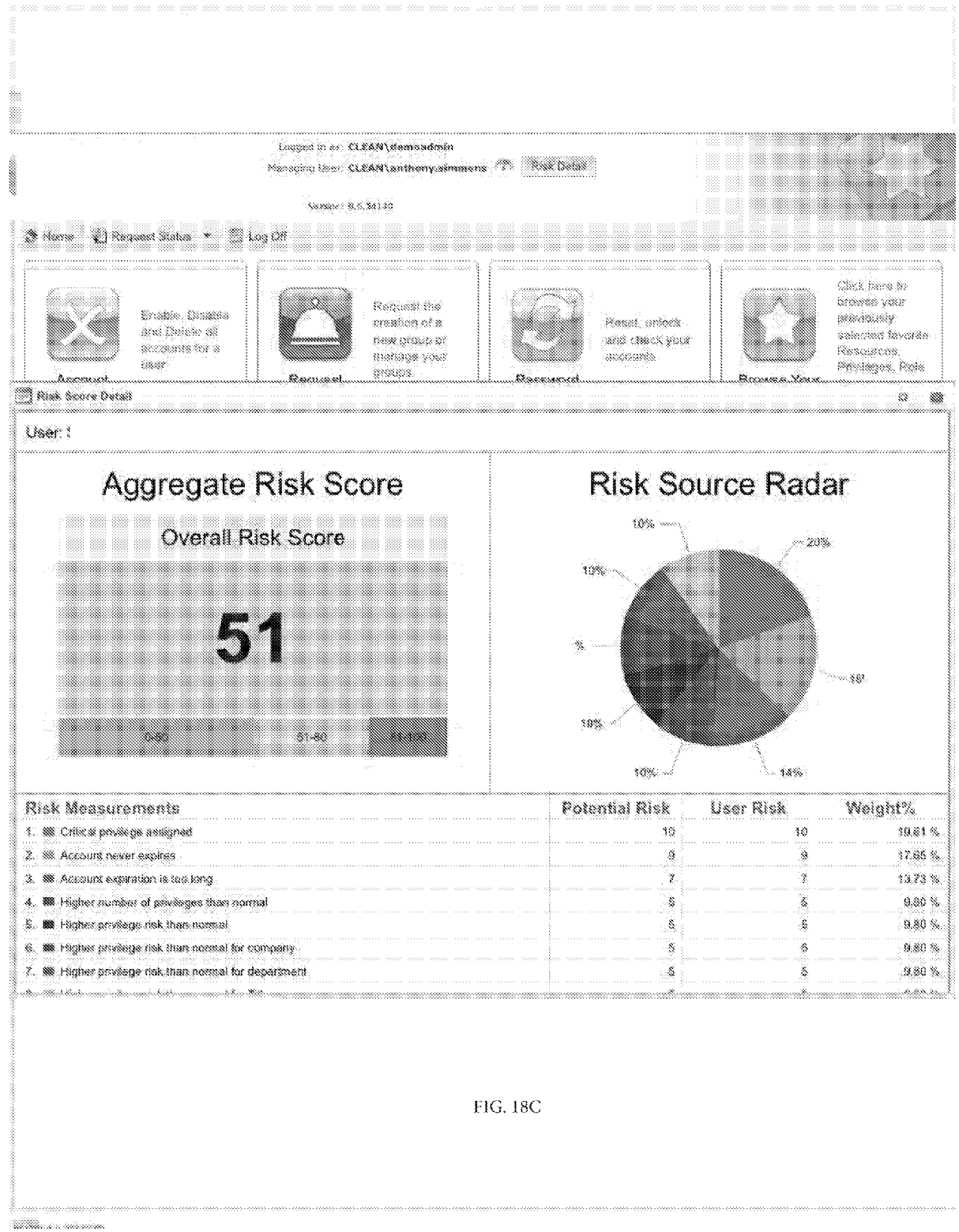
Figure 18D:
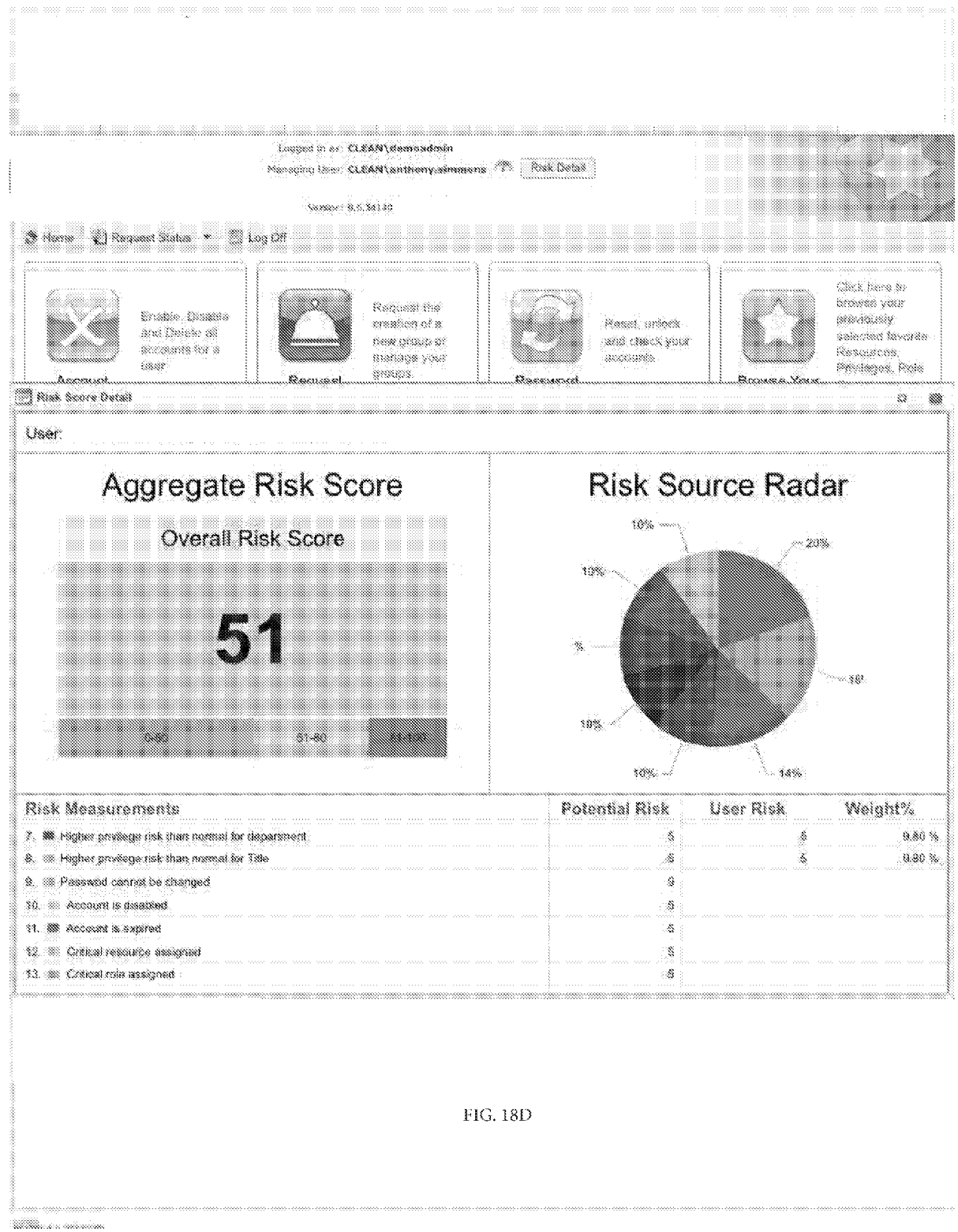
Figure 18E:
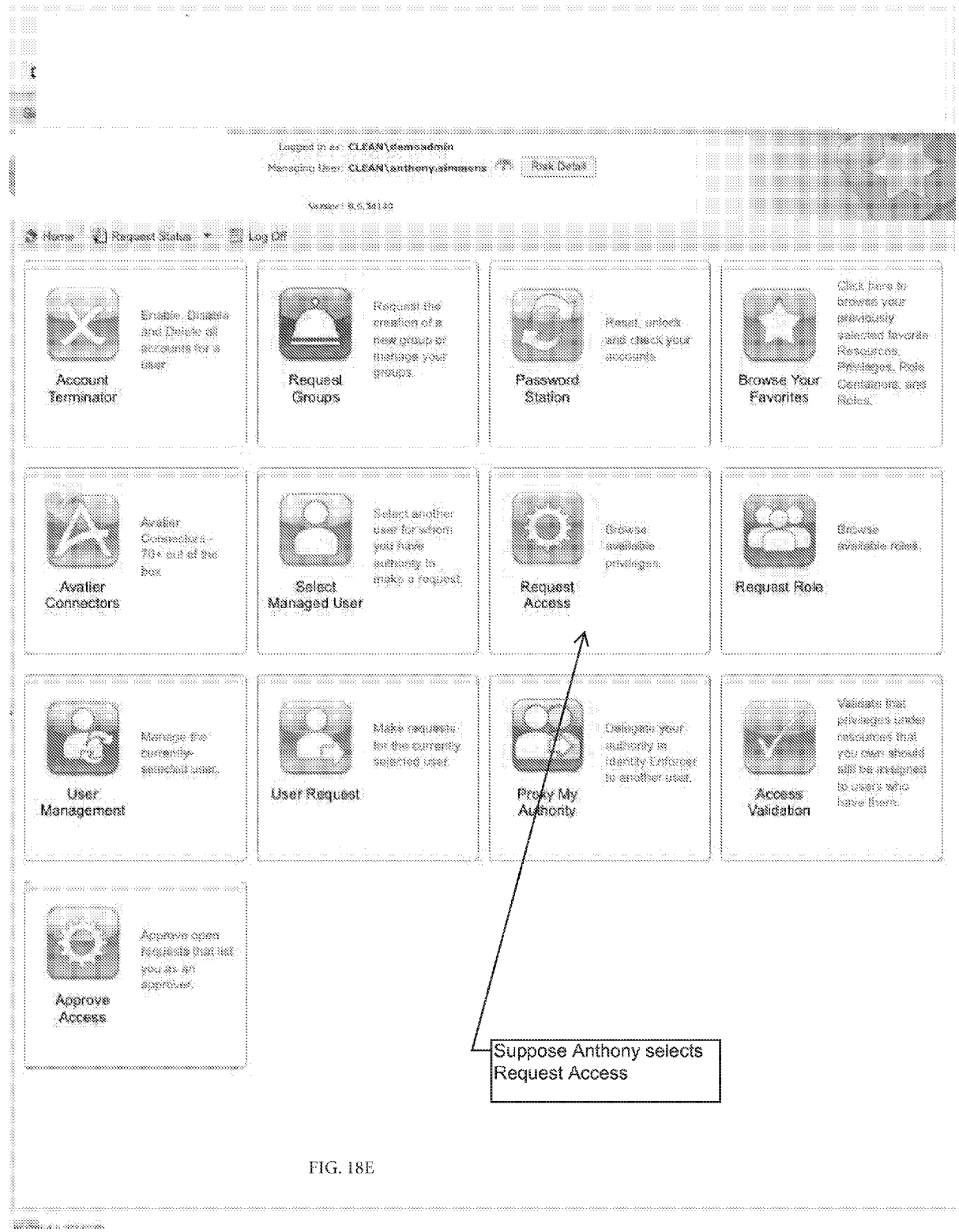

Embodiments can be understood with reference to FIG. 18A-X, exemplary screen shots of an online application, the screen shots showing graphical iconic representations of an interface for requesting a person's risk, displays of computed aggregate risk scores, a risk source radar, defined scores for various badges, and a user interface for assigning risk weights, according to an embodiment.

An embodiment is configured to provide a risk radar or otherwise referred to as a risk source radar. It is beneficial for to have a unified risk score. However, the innovation is configured to show what content comprises that score. In one embodiment, a risk radar or risk source radar is provided. In one implementation, the innovation displays a pie graph broken down by the points of percentage so that the pie graph makes up the total, aggregated risk. Thus, the risk source radar shows what is actually going on and how that risk was derived.

In one implementation, a GUI slider is used to show the spectrum or band of the risk elements. The slider can range from zero to 100. One user may desire to initialize the risk elements to zero or to 50, so that they have some weight. How to initialize the weight assignments can be a design choice.

An embodiment is configured to generate an absolute versus relative score. Also, an embodiment is configured to allow some items to be more relative than others. For example, one can set the elements all to ten percent. However, then each of the risks might now be able to be reduced down much. As well, a user can set an element to absolute, which says out of a specific number of points, e.g. 100 points, if the target person has or reflects this particular risk item, then that user's risk score is assigned an absolute number of points, e.g. 50 points. Then, the remaining elements are each relative to the remaining 50 percent of the risk score.

In one implementation, a user such as an administrator can configure the band for scoring with sliders. Suppose the user has 18 different points to monitor, the user can employ the sliders for the different points as to how they should be scored by the system. It should be appreciated that the number of points is not limiting and can be any number as long as the system can handle such number.

As mentioned previously, a user such as an administrator can configure the color palette such as what's green, what's orange, and what's red. Thus, for example, from zero to 45 is green, 46 to 75 is orange, and 76 and above is red.

An embodiment is configured such that a user can mark an item as critical. Further, a user can mark individual items, such as entitlements or assets, as critical. In one implementation, an item can be flagged as critical for an access or entitlement entity. It should be appreciated that the meaning of critical can be different to different people or organizations. Thus, an embodiment is configured such that in addition to generating the unified risk score, the system can also flag an entity as something to which a user may want to pay attention. Thus, the system can generate a report on items that have been flagged as critical risks. The system can be configured to generate such report whether the risks are green, orange, or red.

An embodiment is configured to present the risk score in an easy and clear manner. The score is a number. In addition to the number, the actual scale that's set by the company can be presented. For instance, a user can see the green, orange, and red bar graph below the score and can also see where are the break points. Thus, for example, when a user receives their score and it is 72, the user also can learn that that's a medium risk from the same presentation. Such presentation is achieved by the system as it integrates predetermined business rules for rating the score and other metadata such as text explanations of what the scores mean, etc. Also, an embodiment is configured to present in a readily recognizable manner, such as pictorially or audibly, where on the spectrum the score lies. For example, with a score of 72, the user can detect that it's very close to being a high risk and can detect how far away it is from being a low risk.

An embodiment is configured to provide a risk radar map. A risk radar map shows the risk points and their respective settings. For example, assume there are five risk points. On a risk radar map, the system can display five matching risk points in order of percentage of weight. The system can further display the other possible risk points on which the user decided not to match. Thus, for example, even if one hasn't set the department risk element, the department might still have a risk associated with it. Such risks can still be displayed in rows that are color-coded, so that they match the color in the pie chart. The risk radar map presented rows which show the number that gets added to compute the risk score. The map can also show a percentage of that score. The risk radar achieves making the presentation of information visual. For instance, a user can see, "Oh, wow, one-third of my risk is coming from," click on it, and it says, "Password never expires".

It should be appreciated that putting aspects of the unified risk score, as discussed herein, out in the cloud is an important and beneficial unique technique that the prior art lacks. Due to techniques herein, based on a user's risk score, the number appears and behind whatever color it is indicative of the risk. For example, suppose the risk score is 72, then it's on an orange or yellow background. There's a 72 there with the banding down below. If it's low, it's green. If it's high it may be a different color so that the meaning of the number is very clear.

In contrast to prior art systems, users do not have to think too hard about the meaning of a score. In an instant, the user can just look at the number and color and immediately recognize or understand its impact. For instance, the user can say to their self, "Oh, red. Stop. Caution." "Orange, caution." "Green. Let's go."

An embodiment is configured to enable immediate recognition with good graphics. One implementation provides graphics that are helpful: one graphics can have the name of the user. And next to that graphic can be a risk score. There can be a little gauge-like GUI, which can indicate the severity of the risk For instance, if it's green, the user can know that the system is telling the user that the target person associated with the score is acceptable.

Further, an embodiment provides risk detail. For instance, if a user clicks on the risk score, that action takes the user to a good, informative graphic that has aggregate risk score of 35. Under the aggregate risk score, the system causes the banding to be shown so that the user knows where the score, e.g. 35, is in relationship to their risk.

In an embodiment, the risk details include several risk measurements. In the drawings are shown only five on which the user matches. The highest two include that the account never expires and that the password cannot be changed. Such two risk measurements make out 50 percent of the 35 score, or 18 points, which is about 50 percent. Then the user can see what the other two make up of that score.

Continuing referring to FIG. 18A-I, one drawings shows an aggregate risk score of 51. There's a different user that's being managed. It's Anthony Simmons, and he has a medium risk, as can be seen at the very top.

An embodiment is configured to provide hover-over capability. Further, it should be appreciated that in one of the examples in FIG. 18A-I, there are more than five items that match for a particular person. Thus, in accordance with an embodiment, if a user hovers-over the pie, and then hovered-over a particular pie section with a mouse, a purple pop up may display and it may say "critical sign." It should be appreciated that some details are by way of example only and are not limiting. Other colors, text, and GUI may be employed without altering the scope of the structure and functionality of the hover-over feature.

In another implementation, the system displays a partial list of risk measurements, compact due to limited space, or a complete list including ones that don't match a defined risk element. Other variations for display are possible in accordance with embodiments of the innovation.

In an example, the system can compute a higher privilege risk than normal for a risk element, e.g. Title (based on one's title). That means this person has a higher score than everyone else in his title for the company.

Figure 18F:
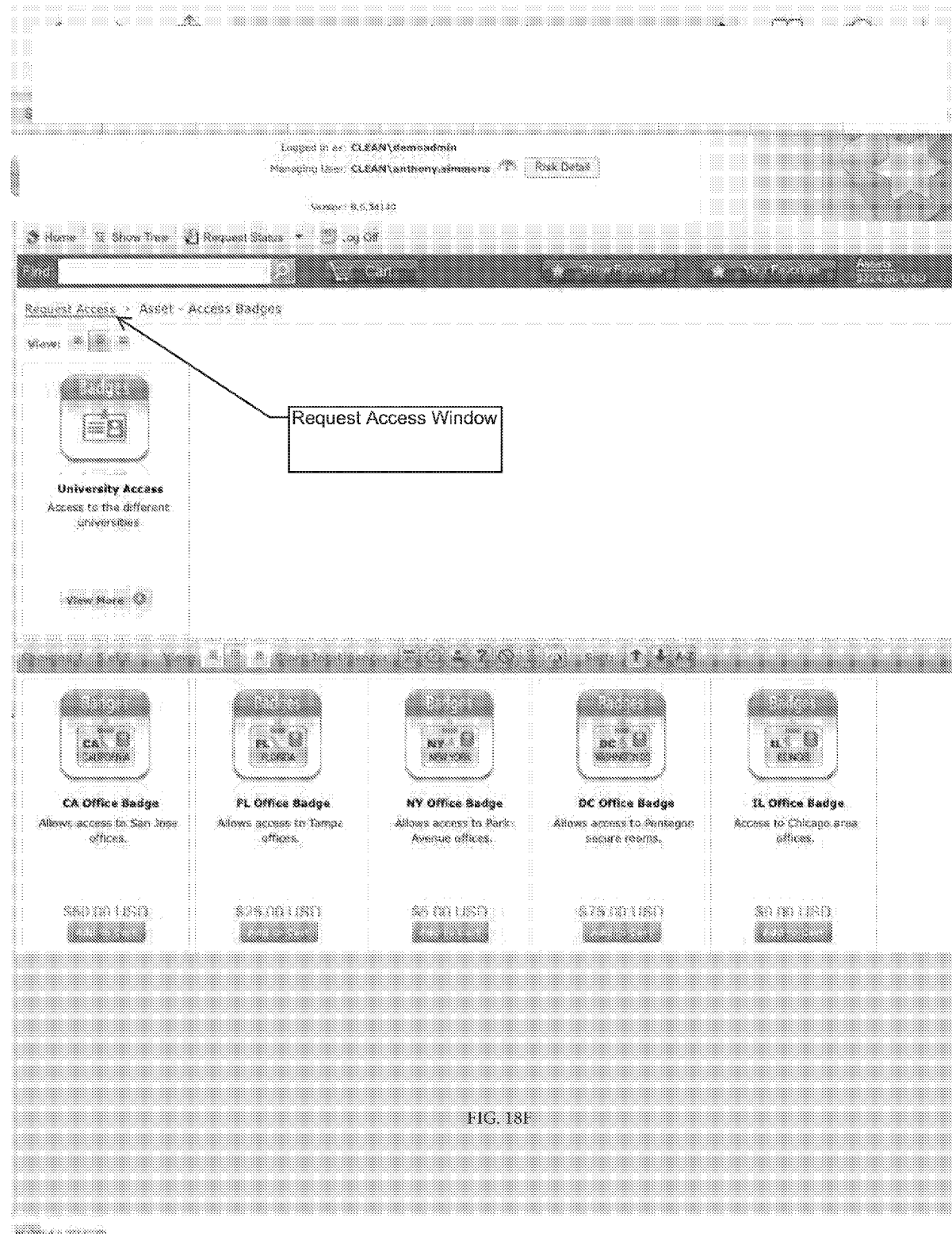
Figure 18G:
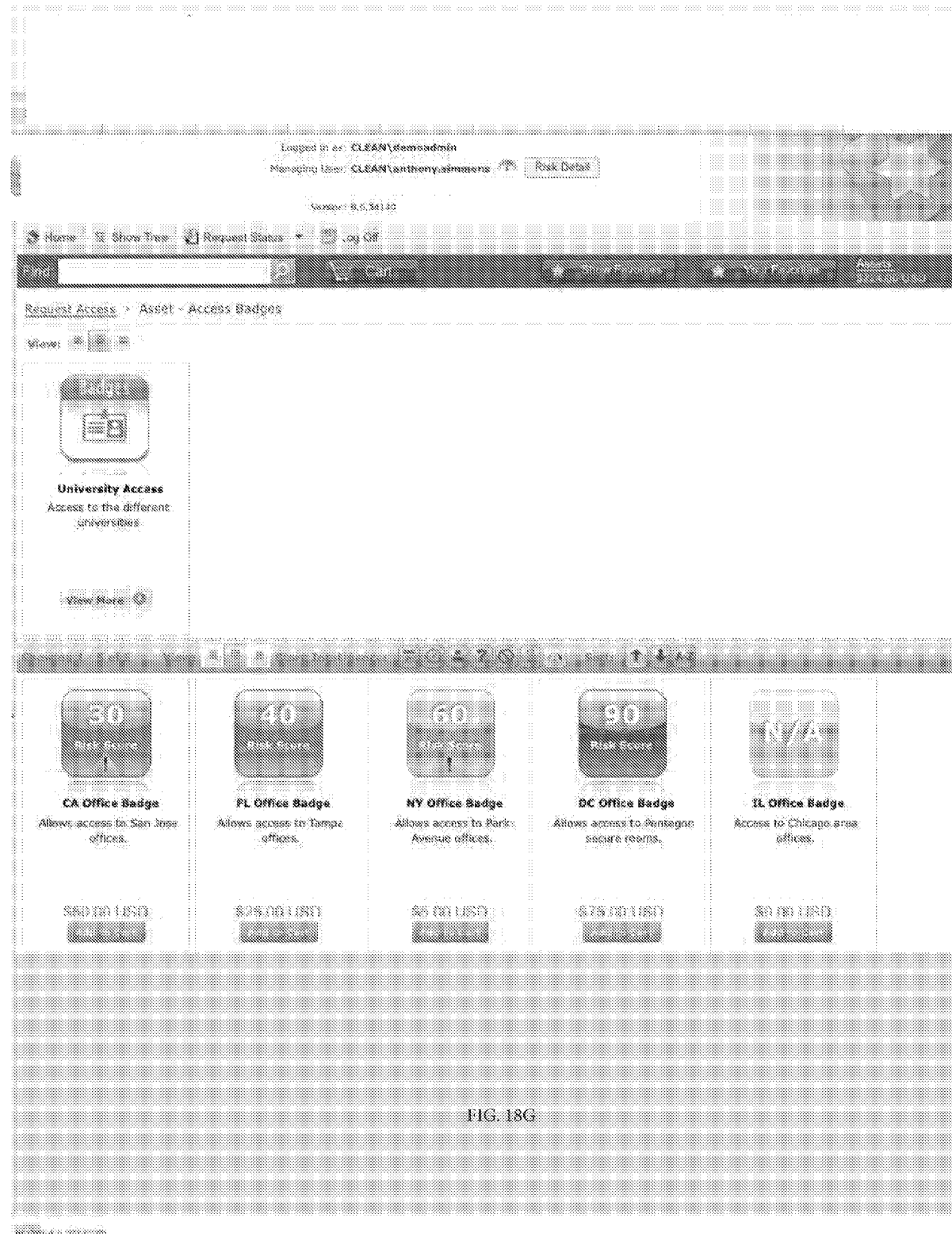
Figure 18H:
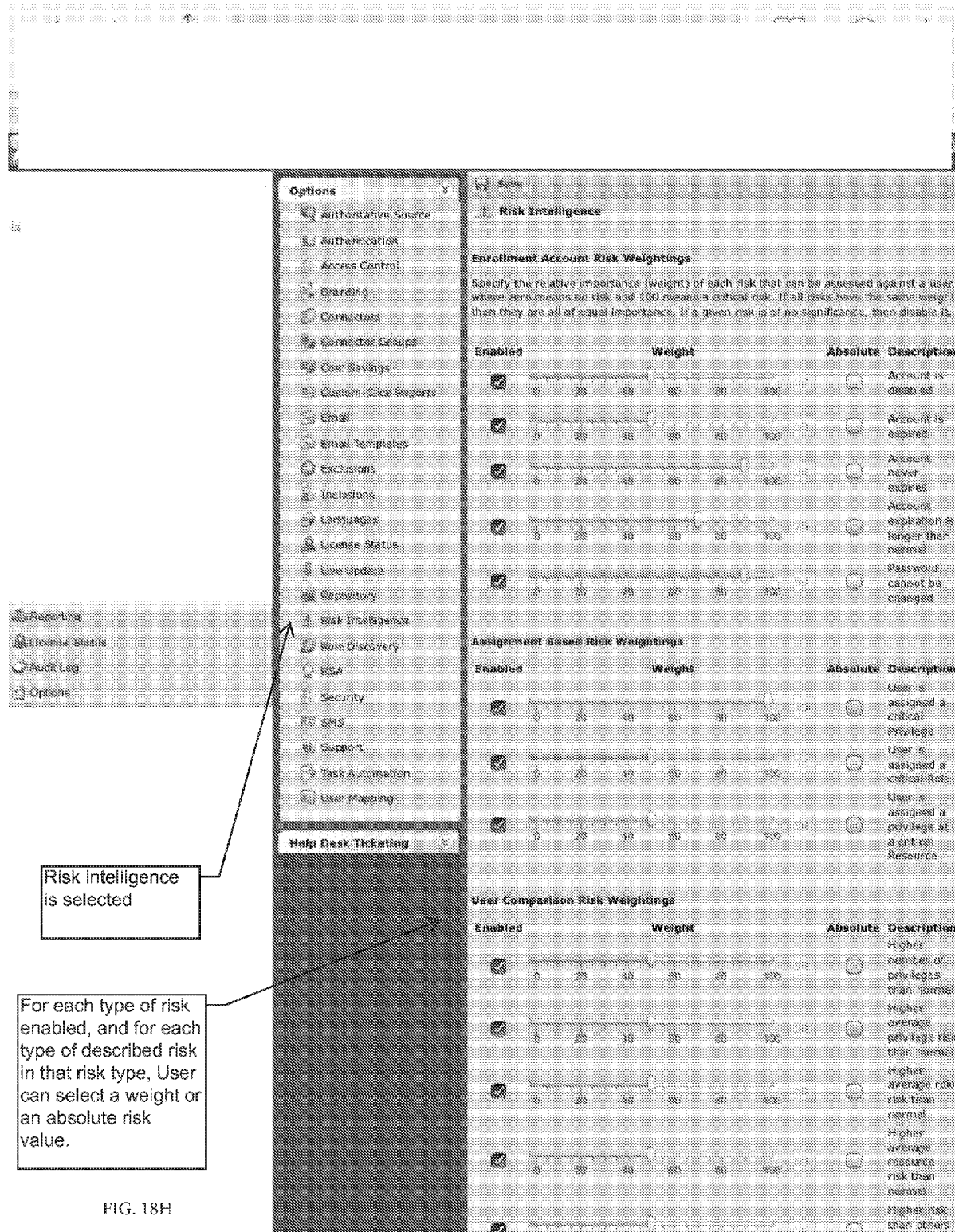
Figure 18I:
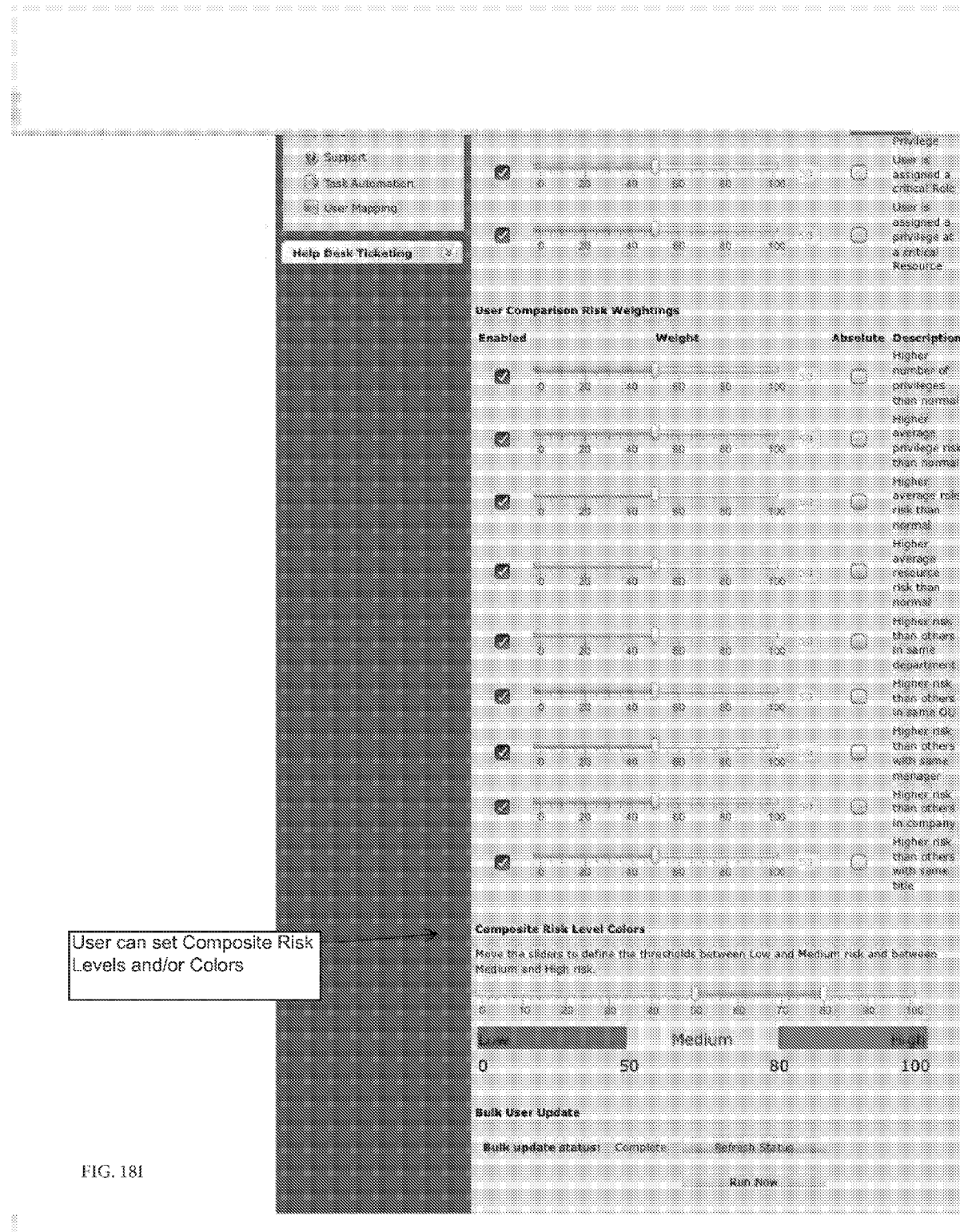

Another example of risk elements are for badges for states. For example, badges for the states of California, Florida, New York, DC, and Illinois can be associated each with a generated risk, as shown in FIG. 18F-G. In accordance with an embodiment, the figure shows that California is 30 percent risk; DC is 90 percent; and Illinois is not available.

It should be appreciated that these are examples of risk measurement. People can have lots of different things for which risk can be generated: badges, risks, car keys, access to databases, and so on.

Risk can boil up into particular entitlements. For example, referring to FIG. 18C-D, it is shown that Anthony has critical privilege assigned. With regard to Anthony's displayed aggregate risk score of 51 with a particular yellow-orange color associated, also shown is that Anthony is assigned critical privilege. Thus, for example, if a person has one or more of such critical privileges, that factor causes changes in that person's weighting, e.g. by 19 percent. Regarding Anthony, he's a domain administrator or he has very, very high privileges within the company or organization.

An embodiment is configured to provide historical trending for a company using, for example, data mining. By data mining any of the aggregation of data and by employing the above-described features regarding risk measurement, risk weighting, aggregate risk scores, the risk source radar, entitlement risk scoring, configuring risk intelligence, configuring composite risk levels, and so on, a risk baseline at the individual or aggregate level can be established by the system. Once a baseline is established, the system can determine or measure whether particular risks or other related entities, such as risk scores, for an individual or group of individuals are above and below a particular baseline. Further, the system can cause doors to lock or unlock, applications to permit or deny access to a user, or bank accounts to automatically be issued, for example.

Exemplary Embodiments

A computer-implemented method, apparatus, and non-transitory computer-readable storage medium having stored thereon a computer program comprising a program code for performing, when the computer program is executed on a computer or processor, for automatically obtaining permission to access a server, database, or online application are provided. The embodiments may include receiving, at a unified risk score processor, a request originating from a requestor for permission to access a server, database, or online application, the request comprising information about the requestor; querying, using the requestor information, an aggregated identity processor for additional information about the requestor, the additional information previously defined by a resource provider that provisions the permission to access the server, database, or online application; receiving from the aggregated identity processor the additional information about the requestor, the additional information comprising authentication data about the requestor that is required by the resource provider for provisioning the permission to access the server, database, or online application; computing, at the unified risk score processor a unified risk score associated with the requestor, based in part on the additional information about the requestor and based on incorporating a plurality of weights assigned by the resource provider to each risk element of a plurality of risk elements of the unified risk score; automatically routing, by the unified risk score processor, the unified risk score and associated metadata comprising a definition of the assigned weights to any of the requestor, the resource provider, or a third-party entity, based on which of the requestor, the resource provider, or the third-party entity requires the permission to the server, database, or online application to perform the access to the server, database, or online application; and automatically causing at the requestor, the provider, or the third-party entity, permitting or denying access to, or exception-processing of, the server, database, or online application, based on the routed unified risk score and the definition of the assigned weights, wherein one or more steps are performed on at least a processor coupled to at least a memory. The embodiments further may include wherein the request further comprises permission to access a building or a room; wherein one weight of the plurality of weights is defined as an absolute value and two or more different weights of the plurality of weights are defined to be relative to each other; wherein one weight of the plurality of weights changes as time increases and in accordance with a defined requirement; automatically updating, by the unified risk score processor, the aggregated identity processor with the unified risk score to provide a feedback loop with the aggregated identity processor; prior to computing the unified risk score, querying the third-party entity, based on the requestor information, the request information, and a second predetermined criteria, wherein the second predetermined criteria is defined by the resource provider or the third-party entity; wherein any of the requestor, the provider, or the third-party marks a particular risk element of the plurality of risk elements as critical via a graphical interface; and wherein the aggregated identity processor is a social login identity provider that receives a username associated with the social login identity provider and the requestor, said username originating from the unified risk score processor, and wherein said social login identity provider queries a lightweight directory access protocol (LDAP) server storing the additional information about the requestor.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A computer-implemented method for automatically obtaining permission to access a server, database, or online application, the method comprising:

receiving, at a unified risk score processor, a request originating from a requestor for permission to access a server, database, or online application, the request comprising information about the requestor;

querying, using the requestor information, an aggregated identity processor for additional information about the requestor, the additional information previously defined by a resource provider that provisions the permission to access the server, database, or online application;

receiving from the aggregated identity processor the additional information about the requestor, the additional information comprising authentication data about the requestor that is required by the resource provider for provisioning the permission to access the server, database, or online application;

receiving, at the unified risk score processor and from the resource provider, a set of rules for a plurality of risk types, the set including a plurality of weights assigned by the resource provider to each risk element of the plurality of risk types, and the plurality of risk types including one or more risk types associated with the server, database, or online application to which permission to access is requested;

computing, at the unified risk score processor a unified risk score associated with the requestor, based in part on the additional information about the requestor, based on the set of rules, and based on the plurality of weights assigned by the resource provider;

automatically routing, by the unified risk score processor, the unified risk score and associated metadata comprising a definition of the assigned weights to any of the requestor, the resource provider, or a third-party entity, based on which of the requestor, the resource provider, or the third-party entity requires the permission to the server, database, or online application to perform the access to the server, database, or online application; and automatically causing at the requestor, the provider, or the third-party entity, permitting or denying access to, or exception-processing of, the server, database, or online application, based on the routed unified risk score and the definition of the assigned weights;

wherein one or more steps are performed on at least a processor coupled to at least a memory.

2. The method of claim 1, wherein the request further comprises permission to access a building or a room.

3. The method of claim 1, wherein one weight of the plurality of weights is defined as an absolute value and two or more different weights of the plurality of weights are defined to be relative to each other.

4. The method of claim 1, wherein one weight of the plurality of weights changes as time increases and in accordance with a defined requirement.

5. The method of claim 1, further comprising:
automatically updating, by the unified risk score processor, the aggregated identity processor with the unified risk score to provide a feedback loop with the aggregated identity processor.

6. The method of claim 1, further comprising:
prior to computing the unified risk score, querying the third-party entity, based on the requestor information, the request information, and a second predetermined criteria, wherein the second predetermined criteria is defined by the resource provider or the third-party entity.

7. The method of claim 1, wherein any of the requestor, the provider, or the third-party marks a particular risk element of the plurality of risk elements as critical via a graphical interface.

8. The method of claim 1, wherein the aggregated identity processor is a social login identity provider that receives a username associated with the social login identity provider and the requestor, said username originating from the unified risk score processor, and wherein said social login identity provider queries a lightweight directory access protocol (LDAP) server storing the additional information about the requestor.

9. An apparatus for automatically obtaining permission to access a server, database, or online application, comprising:
a processor operable to execute computer program instructions; and
a memory operable to store computer program instructions executable by the processor, for performing:
receiving, at a unified risk score processor, a request originating from a requestor for permission to access a server, database, or online application, the request comprising information about the requestor;
querying, using the requestor information, an aggregated identity processor for additional information about the requestor, the additional information previously defined by a resource provider that provisions the permission to access the server, database, or online application;
receiving from the aggregated identity processor the additional information about the requestor, the additional information comprising authentication data about the requestor that is required by the resource provider for provisioning the permission to access the server, database, or online application;
receiving, at the unified risk score processor and from the resource provider, a set of rules for a plurality of risk types, the set including a plurality of weights assigned by the resource provider to each risk element of the plurality of risk types, and the plurality of risk types including one or more risk types associated with the server, database, or online application to which permission to access is requested;
computing, at the unified risk score processor a unified risk score associated with the requestor, based in part on the additional information about the requestor, based on the set of rules, and based on the plurality of weights assigned by the resource provider;
automatically routing, by the unified risk score processor, the unified risk score and associated metadata comprising a definition of the assigned weights to any of the requestor, the resource provider, or a third-party entity, based on which of the requestor, the resource provider, or the third-party entity requires the permission to the server, database, or online application to perform the access to the server, database, or online application; and
automatically causing at the requestor, the provider, or the third-party entity, permitting or denying access to, or exception-processing of, the server, database, or online application, based on the routed unified risk score and the definition of the assigned weights.

10. The apparatus of claim 9, the request further comprises permission to access a building or a room.

11. The apparatus of claim 9, wherein one weight of the plurality of weights is defined as an absolute value and two or more different weights of the plurality of weights are defined to be relative to each other.

12. The apparatus of claim 9, wherein one weight of the plurality of weights changes as time increases and in accordance with a defined requirement.

13. The apparatus of claim 9, wherein the computer program instructions further comprise:
automatically updating, by the unified risk score processor, the aggregated identity processor with the unified risk score to provide a feedback loop with the aggregated identity processor.

14. The apparatus of claim 9, wherein the computer program instructions further comprise:
prior to computing the unified risk score, querying the third-party entity, based on the requestor information, the request information, and a second predetermined criteria, wherein the second predetermined criteria is defined by the resource provider or the third-party entity.

15. The apparatus of claim 9, wherein any of the requestor, the provider, or the third-party marks a particular risk element, of the plurality of risk elements, as critical via a graphical interface.

16. The apparatus of claim 9, wherein the aggregated identity processor is a social login identity provider that receives a username associated with the social login identity provider and the requestor, said username originating from the unified risk score processor, and wherein said social login identity provider queries a lightweight directory access protocol (LDAP) server storing the additional information about the requestor.

17. A non-transitory computer-readable storage medium having stored thereon a computer program comprising a program code for performing, when the computer program is executed on a computer or processor, a method for automatically obtaining permission to access a server, database, or online application, comprising:
receiving, at a unified risk score processor, a request originating from a requestor for permission to access a server, database, or online application, the request comprising information about the requestor;

querying, using the requestor information, an aggregated identity processor for additional information about the requestor, the additional information previously defined by a resource provider that provisions the permission to access the server, database, or online application;

receiving from the aggregated identity processor the additional information about the requestor, the additional information comprising authentication data about the requestor that is required by the resource provider for provisioning the permission to access the server, database, or online application;

receiving, at the unified risk score processor and from the resource provider, a set of rules for a plurality of risk types, the set including a plurality of weights assigned by the resource provider to each risk element of the plurality of risk types, and the plurality of risk types including one or more risk types associated with the server, database, or online application to which permission to access is requested;

computing, at the unified risk score processor a unified risk score associated with the requestor, based in part on the additional information about the requestor, based on the set of rules, and based on the plurality of weights assigned by the resource provider;

automatically routing, by the unified risk score processor, the unified risk score and associated metadata comprising a definition of the assigned weights to any of the requestor, the resource provider, or a third-party entity, based on which of the requestor, the resource provider, or the third-party entity requires the permission to the server, database, or online application to perform the access to the server, database, or online application; and automatically causing at the requestor, the provider, or the third-party entity, permitting or denying access to, or exception-processing of, the server, database, or online application, based on the routed unified risk score and the definition of the assigned weights.

18. The non-transitory computer-readable storage medium of claim 17, wherein the request further comprises permission to access a building or a room.

19. The non-transitory computer-readable storage medium of claim 17, wherein the computer program code further comprises:

automatically updating, by the unified risk score processor, the aggregated identity processor with the unified risk score to provide a feedback loop with the aggregated identity processor.

20. The non-transitory computer-readable storage medium of claim 17, wherein the aggregated identity processor is a social login identity provider that receives a username associated with the social login identity provider and the requestor, said username originating from the unified risk score processor, and wherein said social login identity provider queries a lightweight directory access protocol (LDAP) server storing the additional information about the requestor.

* * * * *